(12) United States Patent
Kidera et al.

(10) Patent No.: US 11,253,782 B2
(45) Date of Patent: Feb. 22, 2022

(54) GAME PROGRAM, AND METHOD FOR CONTROLLING GAME PROGRAM

(71) Applicant: SQUARE ENIX CO., LTD., Tokyo (JP)

(72) Inventors: Yasuhiro Kidera, Tokyo (JP); Hirohito Suzuki, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/637,984

(22) PCT Filed: Aug. 16, 2017

(86) PCT No.: PCT/JP2017/029478
§ 371 (c)(1),
(2) Date: Feb. 10, 2020

(87) PCT Pub. No.: WO2019/035193
PCT Pub. Date: Feb. 21, 2019

(65) Prior Publication Data

US 2020/0215437 A1    Jul. 9, 2020

(51) Int. Cl.
*A63F 13/65* (2014.01)
*A63F 13/216* (2014.01)

(52) U.S. Cl.
CPC ............ *A63F 13/65* (2014.09); *A63F 13/216* (2014.09)

(58) Field of Classification Search
CPC ......... A63F 13/65; A63F 13/216; A63F 13/69
See application file for complete search history.

(56) References Cited

U.S. PATENT DOCUMENTS

| 6,932,698 | B2 * | 8/2005 | Sprogis | A63F 13/12 463/9 |
| 2002/0090985 | A1 * | 7/2002 | Tochner | A63F 13/655 463/1 |
| 2010/0162149 | A1 * | 6/2010 | Sheleheda | A63F 13/65 715/764 |
| 2011/0312407 | A1 * | 12/2011 | Sakurai | A63F 13/63 463/23 |

(Continued)

FOREIGN PATENT DOCUMENTS

| JP | 2002-282553 | 10/2002 |
| JP | 2003-000940 | 1/2003 |

(Continued)

OTHER PUBLICATIONS

Office Action from Japan Patent Office (JPO) in Japanese Patent Appl. No. 2019-536388, dated Jul. 28, 2020, together with an English language translation.

(Continued)

*Primary Examiner* — Kevin Y Kim
(74) *Attorney, Agent, or Firm* — Greenblum & Bernstein, P.L.C.

(57) ABSTRACT

To provide a game that uses a position of a player terminal in the real world and can improve satisfaction of a player who cannot perform sufficient movement in the real world is an object. To give a game which advance based on a position of a player terminal. To give a game which advance based on a predetermined position in the real world that is different from a position of a player in a case where a predetermined first condition is satisfied.

16 Claims, 18 Drawing Sheets

(56) References Cited

U.S. PATENT DOCUMENTS

2012/0315992 A1 12/2012 Gerson et al.
2014/0295963 A1 10/2014 Ishikawa et al.

FOREIGN PATENT DOCUMENTS

| JP | 2005-058537 | 3/2005 |
| JP | 2007-222640 | 9/2007 |
| JP | 2014-188010 | 10/2014 |
| JP | 2014-217566 | 11/2014 |
| JP | 2016-116796 | 6/2016 |

OTHER PUBLICATIONS

International Search Report issued in International Patent Application No. PCT/JP2017/029478, dated Nov. 21, 2017.
Written Opinion of the International Searching Authority issued in International Application No. PCT/JP2017/029478, dated Nov. 21, 2017.
Finding and Catching wild Pokemon, "Pokemon GO" official site, [online] [searched on Jul. 24, 2017], Internet (URL: https://support.POKEMONGO.nianticlabs.com/hc/en-us/articles/221957648-Finding-and-Catching-wild-Pokemon).
"'Gurumon' Shibuya no Machi de 'ARxGPS' de Dasshutsu Event o Kaisai!", [online], Spicysoft Corp., VR Inside , Apr. 24, 2017, [retrieval date Nov. 8, 2017 (Nov. 11, 2017)], Internet,URL: https://vrinside.jp/news/argurumon/>, together with a partial English language translation.
"'Gurumon' nite AR o Tsukatta Dasshutsu Game 'Gurumon 100' -Shibuya karano Dasshutsu' ga Kaisai!", [online], Yahoo Japan Corp., Yahoo! Japan Game, Apr. 4, 2017, [retrieval date Nov. 8, 2017 (Nov. 8, 2017)], Internet ,URL: https://games.yahoo.co.jp/news/item?n=20170404-00000013-ygame_gamedeets>, together with a partial English language translation.
"SQEX Shinsaku no 'Gurumon' wa Ichi Joho o Tsukatte Nihonju o Tabishite Asoberu Monster Ikusei RPG Datta!", [online], Gzbrain Inc., Fami-tsu App, Sep. 22, 2016, [retrival date Nov. 8, 2017 (Nov. 11, 2017)], Internet,URL: https://app.famitsu.com/20160922_843664/>, together with a partial English language translation.
"'Pokemon Go' no Kiso Chishiki", Pocket Monster Sun Pocket Monster Moon Joho Saizensen-Front Line-/'Pokemon Go' Trainers Book Dengeki Nintendo the October issue supplement, Kadokawa Corp., Aug. 20, 2016, pp. 6 to 9, together with a partial English language translation.
Office Action from Japan Patent Office (JPO) in Japanese Patent Appl. No. 2019-536388, dated Mar. 2, 2021, together with an English language translation.

* cited by examiner

| GROUP NAME | DEFAULT PARAMETER | DEFAULT RANDOM SELECTION PROBABILITY |
|---|---|---|
| GROUP OF A FIRE ATTRIBUTE | 200 | 20% |
| GROUP OF A WATER ATTRIBUTE | 200 | 20% |
| ... | ... | ... |
| | SUM 1000 | SUM 100% |

| GAME MEDIUM ID | DEFAULT PARAMETER | DEFAULT RANDOM SELECTION PROBABILITY |
|---|---|---|
| 001 | 100 | 10% |
| 002 | 100 | 10% |
| 003 | 50 | 5% |
| ... | ... | ... |
| | SUM 1000 | SUM 100% |

442 / 443 / 444

GAME PROGRAM, AND METHOD FOR CONTROLLING GAME PROGRAM

TECHNICAL FIELD

The present invention relates to a game program, and method for controlling a game program.

BACKGROUND ART

In the related art, there is a game using a position of a player terminal measured by using a positioning system such as a GPS. For example, NPL 1 discloses that the type of game medium (which appears on a game) that can be acquired by a player differs depending on a position of a player terminal in the real world.

CITATION LIST

Non Patent Literature

[NPL 1] "PokemonGO" official site, [online], [searched on Jul. 24, 2017], Internet (URL: https://support.POKEMONGO.nianticlabs.com/hc/en-us/articles/221957648-Finding-and-Catching-wild-Pokemon)

SUMMARY OF INVENTION

Technical Problem

However, in the game disclosed in NPL 1, there is a problem in that a player who cannot perform sufficient movement in the real world cannot sufficiently enjoy the game. For example, in the game disclosed in NPL 1, in order to acquire a game medium associated with a specific area of the real world, a player is required to go to the specific area, but there is a player living in an area far away from the specific area or a player who cannot afford to go to the specific area. It is difficult for such a player to sufficiently enjoy a game as disclosed in NPL 1.

An object of at least one embodiment of the present invention is to provide a game that uses a position of a player terminal in the real world and can improve satisfaction of a player who cannot perform sufficient movement in the real world.

Solution to Problem

According to a non-limiting aspect, a game program executed in a computer apparatus that is connectable to a plurality of player terminals each of which is operated by a player through communication, the game program causing the computer apparatus to function as: a receiver that receives position information regarding a position of the player terminal in the real world; a first game information transmitter that transmits first game information corresponding to the position indicated by the position information received by the receiver to the player terminal; and a second game information transmitter that transmits, to the player terminal, second game information corresponding to a predetermined position in the real world that is different from the position indicated by the position information received by the receiver in a case where a predetermined first condition is satisfied, wherein the player terminal transmits the position information regarding the position of the player terminal in the real world to the computer apparatus, receives the first game information transmitted by the first game information transmitter and/or the second game information transmitted by the second game information transmitter, and advances a game on the basis of the received first game information and/or second game information.

According to a non-limiting aspect, a method for controlling a game program executed in a computer apparatus that is connectable to a plurality of player terminals each of which is operated by a player through communication, the method causing the computer apparatus to execute: a reception step of receiving position information regarding a position of the player terminal in the real world; a first game information transmission step of transmitting first game information corresponding to the position indicated by the position information received in the reception step to the player terminal; and a second game information transmission step of transmitting, to the player terminal, second game information corresponding to a predetermined position in the real world that is different from the position indicated by the position information received in the reception step in a case where a predetermined first condition is satisfied, wherein the player terminal transmits the position information regarding the position of the player terminal in the real world to the computer apparatus, receives the first game information transmitted in the first game information transmission step and/or the second game information transmitted in the second game information transmission step, and advances a game on the basis of the received first game information and/or second game information.

Advantageous Effects of Invention

One or more of the above problems can be solved with each embodiment of the present invention.

BRIEF DESCRIPTION OF THE DRAWINGS

FIGS. 22A and 22B are examples of master tables regarding a probability of random selection of a game medium, corresponding to at least one of the embodiments of the present invention.

DESCRIPTION OF EMBODIMENTS

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

First Embodiment

First, a description will be made of a summary of a first embodiment of the present invention. Hereinafter, as the first embodiment, a description will be made of an example of a game program executed in a computer apparatus that is connectable through communication to a plurality of player terminals operated by respective players.

Figure 1:
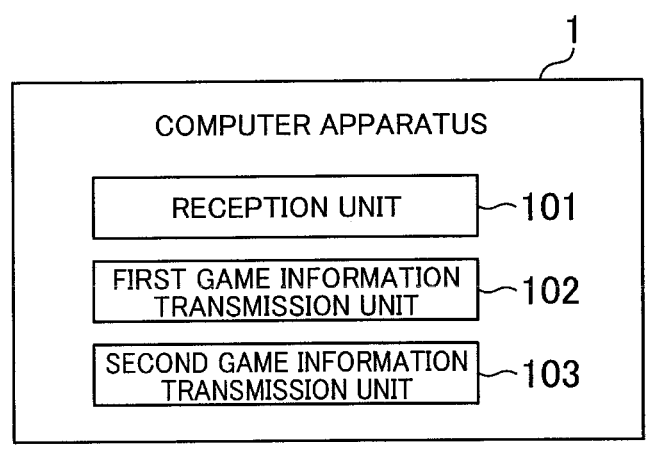
FIG. 1 is a block diagram illustrating a configuration of a computer apparatus, corresponding to at least one of embodiments of the present invention.

FIG. 1 is a block diagram illustrating a configuration of a computer apparatus, corresponding to at least one of embodiments of the present invention. A computer apparatus 1 includes at least a reception unit 101, a first game information transmission unit 102, and a second game information transmission unit 103.

The reception unit 101 has a function for receiving position information regarding a position of a player terminal in the real world. The first game information transmission unit 102 has a function for transmitting first game information corresponding to the position indicated by the position information received by the reception unit 101, to the player terminal. The second game information transmission unit 103 has a function for transmitting second game information corresponding to a predetermined position in the real world that is different from the position indicated by the position information received by the reception unit 101, to the player terminal, in a case where a predetermined first condition is satisfied.

Figure 2:
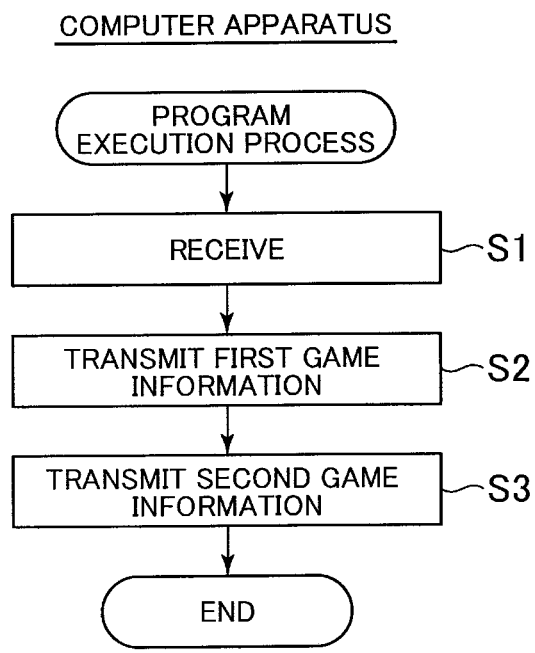
FIG. 2 is a flowchart illustrating a program execution process corresponding to at least one of the embodiments of the present invention.

Next, a description will be made of a program (game program) execution process in the first embodiment of the present invention. FIG. 2 is a flowchart illustrating a program execution process corresponding to at least one of the embodiments of the present invention.

The computer apparatus 1 receives position information regarding a position of a player terminal in the real world (step S1). Next, the computer apparatus 1 transmits first game information corresponding to the position indicated by the position information received in step S1 to the player terminal (step S2). In a case where a predetermined first condition is satisfied, the computer apparatus 1 transmits second game information corresponding to a predetermined position in the real world which is different from the position indicated by the position information received in step S1, to the player terminal (step S3), and terminates the process.

The player terminal transmits the position information regarding the position of the player terminal in the real world to the computer apparatus. The player terminal receives the first game information transmitted in step S2 and/or the second game information transmitted in step S3. The player terminal advances a game on the basis of the received first game information and/or second game information.

As one aspect of the first embodiment, in a game using a position of a player terminal in the real world, it is possible to improve the satisfaction of a player who cannot perform sufficient movement in the real world.

In the first embodiment, the "player terminal" indicates, for example, a mobile phone, a smart phone, a tablet computer, a personal computer, a portable game machine, a stationary game machine, or a wearable terminal that is communicable with a computer apparatus and can perform a game execution process. The "player" indicates, for example, a user who operates a player terminal and plays a game. The "computer apparatus" indicates, for example, an apparatus that executes a process in response to a request from a player terminal. The "game" indicates, for example, a computer game executed by starting a program in a computer apparatus and/or a player terminal, and a genre of a game content does not matter.

The "position information" indicates, for example, information regarding the current position of a player terminal in the real world, measured by using a GPS sensor provided in a player terminal or a wireless network system or the like of the player terminal. Here, the "position" is not limited to a planar position represented by latitude and longitude, and may be the concept further including a height.

The "first game information" is, for example, game information associated with a position indicated by position information of a player terminal or a predetermined region including the position. The "second game information" is, for example, game information associated with a position that is different from a position indicated by position information of a player terminal or a predetermined region including the different position.

Here, the "game information" may be, for example, information regarding at least one game medium or map information. The "region" indicates, for example, a region having a predetermined area, such as the national unit, the prefectural unit, the municipal unit, or a specific region (for example, Tokyo Station). The "different position" may include, for example, a position of another player terminal, a position when another player performs a predetermined operation, and a position of a predetermined building (for example, Tokyo Tower or the White House). The "game medium" indicates, for example, digital content used in a game by a player, and may include a card, a character, a weapon, an armor, an item, and an avatar. The "information regarding a game medium" indicates, for example, information regarding an image or a status of the game medium, or information regarding identification information (ID) of the game medium required to specify the image or the status of the game medium. The "information regarding a game medium" may include an appearance probability of the game medium.

The "predetermined first condition" is, for example, a condition for transmitting the second game information to a player terminal, and may be set as appropriate depending on a genre or a content of a game. The "predetermined first condition" may include, for example, a player terminal making a transmission request for the second game information, a player clearing a predetermined game task (for example, a quest or an event), or a player participating to a predetermined event in a game. The phrase "advancing a game" may include, for example, causing a game medium to appear, displaying a map, or changing a parameter associated with a player or a player character, on the basis of the first game information and/or the second game information.

Second Embodiment

Next, a description will be made of a summary of a second embodiment of the present invention. Hereinafter, as the second embodiment, a description will be made of an example of a game program executed in a computer apparatus that is connectable through communication to a plurality of player terminals operated by respective players.

As a configuration of a computer apparatus in the second embodiment, the configuration illustrated in the block diagram of FIG. 1 may be adopted within a necessary scope. As a flow of a program execution process in the second embodiment, the process illustrated in the flowchart of FIG. 2 may be adopted within a necessary scope.

In the second embodiment, the first game information transmitted from the first game information transmission unit 102 and the second game information transmitted from the second game information transmission unit 103 include information regarding a game medium that can be acquired by a player. In other words, the first game information transmitted in step S2 includes information regarding a game medium that can be acquired by a player. The second game information transmitted in step S3 includes information regarding a game medium that can be acquired by a player.

As one aspect of the second embodiment, a player can acquire a game medium corresponding to a position different from a position of a player terminal, and thus it is possible to improve the satisfaction of the player.

In the second embodiment, the "player terminal", the "player", the "computer apparatus", the "game", the "position information", the "position", the "first game information", the "second game information", the "game information", the "region", the "different position", the "game medium", the "information regarding a game medium", the "predetermined first condition", and the phrase "advancing a game", the contents described in the first embodiment can be adopted respectively within a necessary scope.

In the second embodiment, the term "acquisition" indicates, for example, that a game medium is associated with a player, and the player can use the game medium in a game. Here, the phrase "a game medium being associated with a player" indicates, for example, that player information is updated such that information regarding the game medium is included in the player information managed by the computer apparatus. The term "acquisition" also includes a case where a player can use a game medium only for a predetermined period, such as a case of rental.

Third Embodiment

Next, a description will be made of a summary of a third embodiment of the present invention. Hereinafter, as the third embodiment, a description will be made of an example of a game program executed in a computer apparatus that is connectable through communication to a plurality of player terminals operated by respective players.

Figure 3:
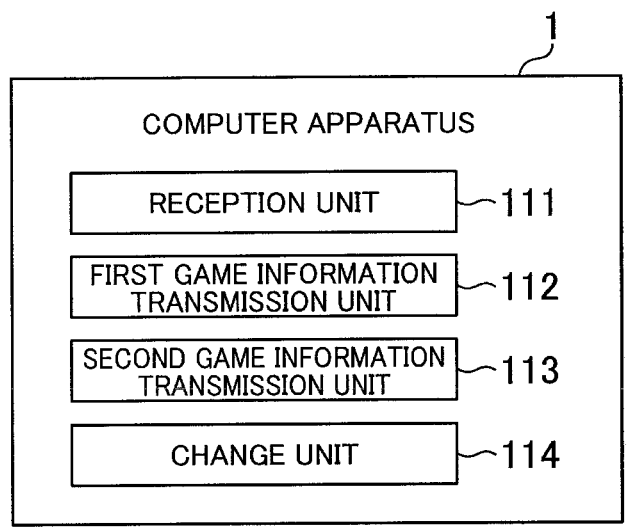
FIG. 3 is a block diagram illustrating a configuration of a computer apparatus, corresponding to at least one of embodiments of the present invention.

FIG. 3 is a block diagram illustrating a configuration of a computer apparatus, corresponding to at least one of embodiments of the present invention. A computer apparatus 1 includes at least a reception unit 111, a first game information transmission unit 112, a second game information transmission unit 113, and a change unit 114.

The reception unit 111 has a function for receiving position information regarding a position of a player terminal in the real world. The first game information transmission unit 112 has a function for transmitting first game information corresponding to the position indicated by the position information received by the reception unit 111, to the player terminal. The second game information transmission unit 113 has a function for transmitting second game information corresponding to a predetermined position in the real world that is different from the position indicated by the position information received by the reception unit 111, to the player terminal, in a case where a predetermined first condition is satisfied. The second game information includes position information regarding the predetermined position. The change unit 114 has a function for changing the predetermined position according to movement of a position of the player terminal in the real world in a case where the player terminal advances a game on the basis of the second game information.

Figure 4:
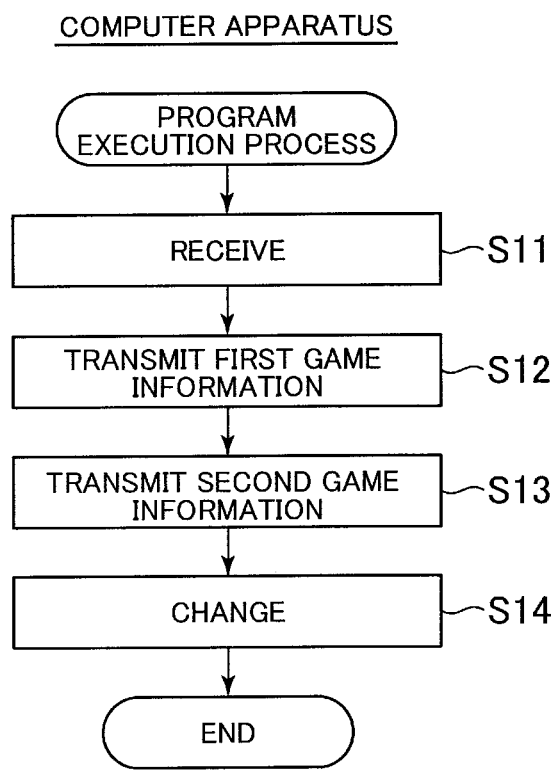
FIG. 4 is a flowchart illustrating a program execution process corresponding to at least one of the embodiments of the present invention.

Next, a description will be made of a program (game program) execution process in the third embodiment of the present invention. FIG. 4 is a flowchart illustrating a program execution process corresponding to at least one of the embodiments of the present invention.

The computer apparatus 1 receives position information regarding a position of a player terminal in the real world (step S11). Next, the computer apparatus 1 transmits first game information corresponding to the position indicated by the position information received in step S11 to the player terminal (step S12). In a case where a predetermined first condition is satisfied, the computer apparatus 1 transmits second game information corresponding to a predetermined position in the real world which is different from the position indicated by the position information received in step S11, to the player terminal (step S13). Next, the computer apparatus 1 changes the predetermined position according to movement of position of the player terminal in the real world in a case where the player terminal advances a game on the basis of the second game information (step S14), and terminates the process.

The player terminal transmits the position information regarding the position of the player terminal in the real world to the computer apparatus. The player terminal receives the first game information transmitted in step S12 and/or the second game information transmitted in step S13. The second game information includes position information regarding the predetermined position. The player terminal advances a game on the basis of the received first game information and/or second game information. In a case where the game is advanced on the basis of the second game information, the player terminal displays a map of the real world corresponding to the position information regarding the predetermined position, and advances the game by virtualizing the predetermined position as a position of the player terminal in the real world.

As one aspect of the third embodiment, a map corresponding to a predetermined position different from a position of a player terminal is displayed, a game is advanced by virtualizing the predetermined position as a position of the player terminal in the real world, and thus it is possible to improve amusement of the game.

In the third embodiment, the "player terminal", the "player", the "computer apparatus", the "game", the "position information", the "position", the "first game information", the "second game information", the "game information", the "region", the "different position", the "game medium", the "information regarding a game medium", the "predetermined first condition", and the phrase "advancing a game", the contents described in the first embodiment can be adopted respectively within a necessary scope.

In the third embodiment, the "map in the real world" is, for example, a map including a predetermined position indicated by position information included in the second game information, and may include, for example, a map corresponding to a region (for example, a region within a range of surrounding 5 km from a position of a player terminal) within a range of a predetermined distance from a reference point with the predetermined position as the reference point. The map may be two-dimensional, and may be three-dimensional. The phrase "advancing a game by virtualizing" indicates, for example, that a position of a player terminal is regarded to be a predetermined position different from the position, and the game is advanced. Specifically, a position displayed as the current position of a player on a player terminal is assumed to be the predetermined position, or an appearing game medium is changed to a game medium corresponding to the predetermined position.

The phrase "changing according to movement" indicates that a virtualized position of a player terminal is changed according to movement of a real position of the player terminal. Specifically, in a case where a player terminal advances a game on the basis of the second game information, first, a predetermined position A included in the second game information that is initially received is virtualized as a position of the player terminal. Next, when a player terminal A is moved 100 m northward, a predetermined position B resulting from being moved 100 m northward from the predetermined position A is virtualized as a position of a player terminal B, and the second game information corresponding to the predetermined position B is transmitted to the player terminal.

Fourth Embodiment

Next, a description will be made of a summary of a fourth embodiment of the present invention. Hereinafter, as the fourth embodiment, a description will be made of an example of a game program executed in a computer apparatus that is connectable through communication to a plurality of player terminals operated by respective players.

Figure 5:
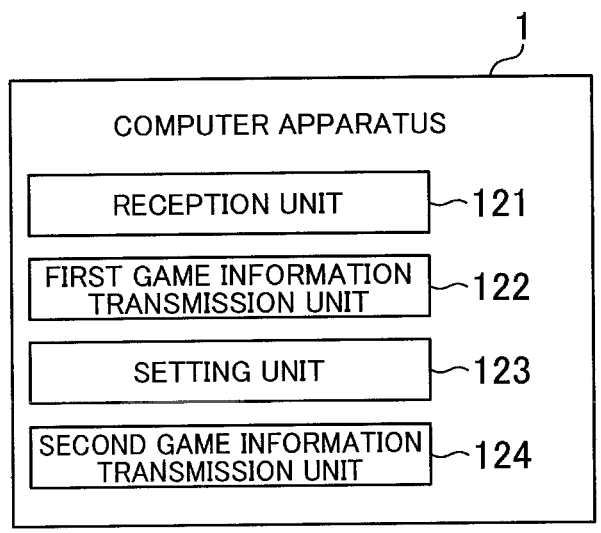
FIG. 5 is a block diagram illustrating a configuration of a computer apparatus, corresponding to at least one of embodiments of the present invention.

FIG. 5 is a block diagram illustrating a configuration of a computer apparatus, corresponding to at least one of embodiments of the present invention. A computer apparatus 1 includes at least a reception unit 121, a first game information transmission unit 122, a setting unit 123, and a second game information transmission unit 124.

The reception unit 121 has a function for receiving position information regarding a position of a player terminal in the real world. The first game information transmission unit 122 has a function for transmitting first game information corresponding to the position indicated by the position information received by the reception unit 121, to the player terminal. The setting unit 123 has a function for setting a predetermined position on the basis of another-player information regarding another player or an event content in a game, in a case where a predetermined second condition is satisfied. The second game information transmission unit 124 has a function for transmitting second game information corresponding to a predetermined position set by the setting unit 123, to the player terminal, in a case where a predetermined first condition is satisfied.

Figure 6:
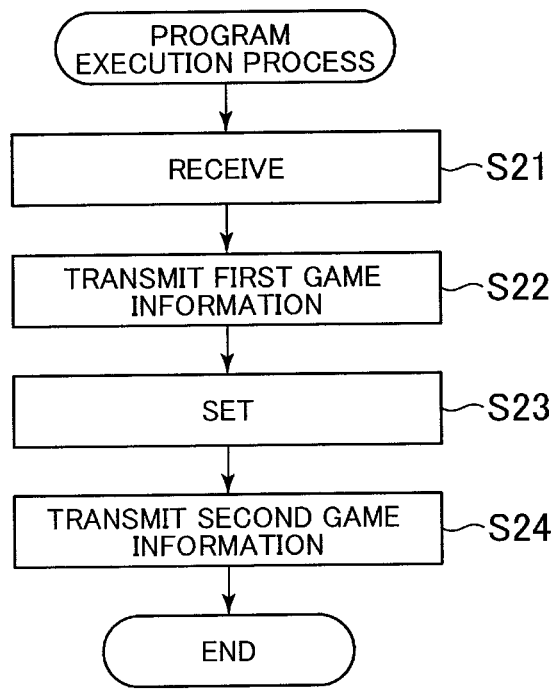
FIG. 6 is a flowchart illustrating a program execution process corresponding to at least one of the embodiments of the present invention.

Next, a description will be made of a program (game program) execution process in the fourth embodiment of the present invention. FIG. 6 is a flowchart illustrating a program execution process corresponding to at least one of the embodiments of the present invention.

The computer apparatus 1 receives position information regarding a position of a player terminal in the real world (step S21). Next, the computer apparatus 1 transmits first game information corresponding to the position indicated by the position information received in step S21 to the player terminal (step S22). In a case where a predetermined second condition is satisfied, the computer apparatus 1 sets a predetermined position on the basis of another-player information regarding another player or an event content in a game (step S23). Next, in a case where a predetermined first condition is satisfied, the computer apparatus 1 transmits second game information corresponding to the predetermined position set in step S23, to the player terminal (step S24), and terminates the process.

The player terminal transmits the position information regarding the position of the player terminal in the real world to the computer apparatus. The player terminal receives the first game information transmitted in step S22 and/or the second game information transmitted in step S24. The player terminal advances a game on the basis of the received first game information and/or second game information.

As one aspect of the fourth embodiment, a predetermined position is set on the basis of another-player information regarding another player or an event content in a game, and thus it is possible to improve amusement of the game.

In the fourth embodiment, the "player terminal", the "player", the "computer apparatus", the "game", the "position information", the "position", the "first game information", the "second game information", the "game information", the "region", the "different position", the "game medium", the "information regarding a game medium", the "predetermined first condition", and the phrase "advancing a game", the contents described in the first embodiment can be adopted respectively within a necessary scope.

In the fourth embodiment, the "predetermined second condition" is, for example, a condition for setting a predetermined position, and may be set as appropriate according to a genre or a content of a game. The "predetermined second condition" may include, for example, a computer apparatus receiving predetermined information (for example, information that is input by using a function in a game, such as comment posting or chatting, or a function of an SNS such as Facebook (registered trademark), Twitter (registered trademark), or LINE (registered trademark) interlocking with the game) that is input on another player terminal, a player having a relationship with another player in a game (for example, belonging to an identical guild or party or making friends), or a predetermined event being held in a game.

The "another-player information" may include, for example, information (for example, a player name or a birthplace) registered in a game by another player or position information of another player terminal. The "event" is, for example, an event held in a game, and may be set as appropriate depending on a genre or a content of the game. The "event" may be, for example, an event of virtually searching a predetermined region.

Fifth Embodiment

Next, a description will be made of a summary of a fifth embodiment of the present invention. Hereinafter, as the fifth embodiment, a description will be made of an example of a game program executed in a computer apparatus that is connectable through communication to a plurality of player terminals operated by respective players.

As a configuration of a computer apparatus in the fifth embodiment, the configuration illustrated in the block diagram of FIG. 5 may be adopted within a necessary scope. As a flow of a program execution process in the fifth embodiment, the process illustrated in the flowchart of FIG. 6 may be adopted within a necessary scope.

In the fifth embodiment, the predetermined second condition is that another player terminal receives input of information according to a predetermined function for receiving information input, executed by a game program for a player terminal corresponding to a game program installed in the computer apparatus 1 or another application program interlocking with the game program for the player terminal, and the information is received by the computer apparatus 1. The setting unit 123 has a function for setting a predetermined position on the basis of a position of another player terminal in the real world in a case where the computer apparatus 1 receives the information received according to the predetermined function for receiving information input. The predetermined first condition is that a player terminal accesses information received according to the predetermined function for receiving information input or information associated with the information.

In the fifth embodiment, in step S23, in a case where input of information is received by another player terminal according to a predetermined function for receiving information input, executed by a game program for a player terminal corresponding to a game program installed in the computer apparatus 1 or another application program interlocking with the game program for the player terminal, and the information is received by the computer apparatus 1, a predetermined position is set on the basis of a position of the another player terminal in the real world. In step S24, in a case where a player terminal accesses the information received according to the predetermined function for receiving information input in step S23 or information associated with the information, the second game information corresponding to the predetermined position set in step S23 is transmitted to the player terminal.

The player terminal transmits the position information regarding the position of the player terminal in the real world to the computer apparatus. The player terminal receives the first game information transmitted in step S22 and/or the second game information transmitted in step S24. The player terminal advances a game on the basis of the received first game information and/or second game information.

As one aspect of the fifth embodiment, in a case where input of information is received according to a predetermined function for receiving information input in another player terminal, a position of the another player terminal is set as a predetermined position, and thus communication between players in a game can be activated.

In the fifth embodiment, the "player terminal", the "player", the "computer apparatus", the "game", the "position information", the "position", the "first game information", the "second game information", the "game information", the "region", the "different position", the "game medium", the "information regarding a game medium", the "predetermined first condition", and the phrase "advancing a game", the contents described in the first embodiment can be adopted respectively within a necessary scope. In the fifth embodiment, the "predetermined second condition", the "another-player information", and the "event", the contents described in the fourth embodiment can be adopted respectively within a necessary scope.

In the fifth embodiment, the "interlocking another application program" indicates, for example, an application program that can be started during execution of a game, and may be, for example, an application program similar to an SNS such as Facebook (registered trademark), Twitter (registered trademark), or LINE. The term "access" indicates making an information viewing request or use request, and includes, for example, viewing (selecting) information introduced by another person, or connection to a link included in the information.

Sixth Embodiment

Next, a description will be made of a summary of a sixth embodiment of the present invention. Hereinafter, as the sixth embodiment, a description will be made of an example of a game program executed in a computer apparatus that is connectable through communication to a plurality of player terminals operated by respective players.

Figure 7:
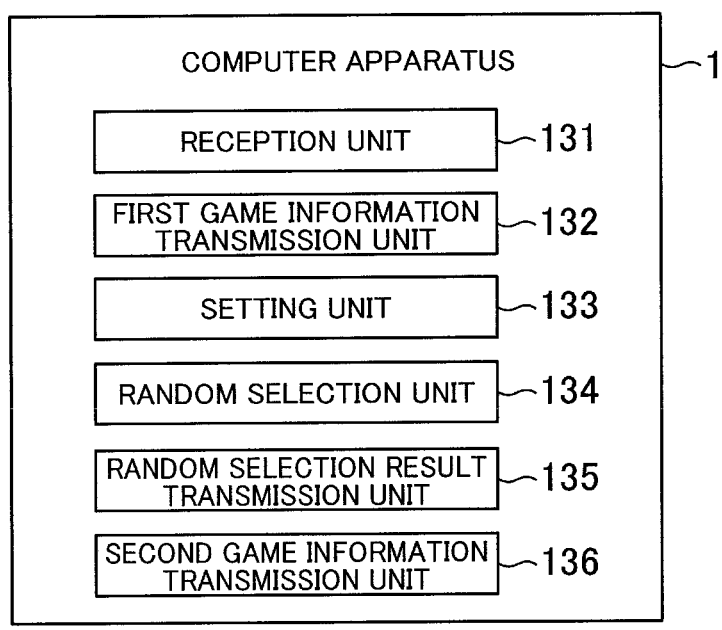
FIG. 7 is a block diagram illustrating a configuration of a computer apparatus, corresponding to at least one of embodiments of the present invention.

FIG. 7 is a block diagram illustrating a configuration of a computer apparatus, corresponding to at least one of embodiments of the present invention. A computer apparatus 1 includes at least a reception unit 131, a first game information transmission unit 132, a setting unit 133, a random selection unit 134, a random selection result transmission unit 135, and a second game information transmission unit 136.

The reception unit 131 has a function for receiving position information regarding a position of a player terminal in the real world. The first game information transmission unit 132 has a function for transmitting first game information corresponding to the position indicated by the position information received by the reception unit 131, to the player terminal.

The setting unit 133 has a function for setting a predetermined position on the basis of a position of another player terminal in the real world in a case where input of information is received by the another player terminal according to a predetermined function for receiving information input, executed by a game program for a player terminal corresponding to a game program installed in the computer apparatus 1 or another application program interlocking with the game program for the player terminal, and the information is received by the computer apparatus 1.

The random selection unit 134 has a function for randomly selecting a game medium in a case of receiving information received according to the predetermined function for receiving information input in the player terminal. The random selection result transmission unit 135 has a function for transmitting information regarding the game medium randomly selected by the random selection unit 134 to the another player terminal. The second game information transmission unit 136 has a function for transmitting second game information corresponding to the predetermined position set by the setting unit 133 to the player terminal in a case where the player terminal accesses the information received according to the predetermined function for receiving information input in the player terminal or information associated with the information.

Figure 8:
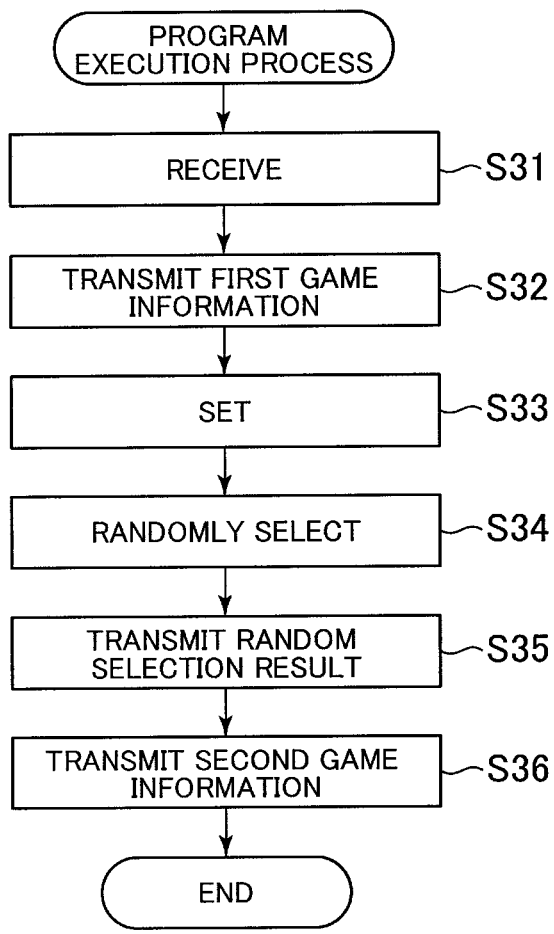
FIG. 8 is a flowchart illustrating a program execution process corresponding to at least one of the embodiments of the present invention.

Next, a description will be made of a program (game program) execution process in the sixth embodiment of the present invention. FIG. 8 is a flowchart illustrating a program execution process corresponding to at least one of the embodiments of the present invention.

The computer apparatus 1 receives position information regarding a position of a player terminal in the real world (step S31). Next, the computer apparatus 1 transmits first game information corresponding to the position indicated by the position information received in step S31 to the player terminal (step S32).

The computer apparatus 1 sets a predetermined position on the basis of a position of another player terminal in the real world in a case where input of information is received by the another player terminal according to a predetermined function for receiving information input, executed by a game program for a player terminal corresponding to a game program installed in the computer apparatus 1 or another application program interlocking with the game program for the player terminal, and the information is received by the computer apparatus 1 (step S33).

The computer apparatus 1 randomly selects a game medium in a case of receiving information received according to the predetermined function for receiving information input in the player terminal (step S34). Next, the computer apparatus 1 transmits information regarding the game medium randomly selected in step S34 to another player terminal (step S35). The computer apparatus 1 transmits second game information corresponding to the predetermined position set in step S33 in a case where the player terminal accesses the information received according to the predetermined function for receiving information input in step S33 or information associated with the information (step S36), and terminates the process.

The player terminal transmits the position information regarding the position of the player terminal in the real world to the computer apparatus. The player terminal receives the first game information transmitted in step S32 and/or the second game information transmitted in step S36. The player terminal advances a game on the basis of the received first game information and/or second game information.

The another player terminal receives the information regarding the game medium transmitted in step S35. The another player terminal enables the game medium corresponding to the received information to be acquired by another player operating the another player terminal.

As one aspect of the sixth embodiment, in a case where input of information is received according to a predetermined function for receiving information input, a game medium that can be acquired by another player is randomly selected, and another player is prompted to input the information such that a frequency of setting a predetermined position can be increased.

In the sixth embodiment, the "player terminal", the "player", the "computer apparatus", the "game", the "position information", the "position", the "first game information", the "second game information", the "game information", the "region", the "different position", the "game medium", the "information regarding a game medium", the "predetermined first condition", and the phrase "advancing a game", the contents described in the first embodiment can be adopted respectively within a necessary scope. In the sixth embodiment, the term "acquisition", the contents described in the second embodiment can be adopted within a necessary scope.

In the sixth embodiment, the "predetermined second condition", the "another-player information", and the "event", the contents described in the fourth embodiment can be adopted respectively within a necessary scope. In the sixth embodiment, the "interlocking another application program" and the term "access", the contents described in the fifth embodiment can be adopted respectively within a necessary scope.

Seventh Embodiment

Next, a description will be made of a summary of a seventh embodiment of the present invention. Hereinafter, as the seventh embodiment, a description will be made of an example of a game program executed in a computer apparatus that is connectable through communication to a plurality of player terminals operated by respective players.

As a configuration of a computer apparatus in the seventh embodiment, the configuration illustrated in the block diagram of FIG. 7 may be adopted within a necessary scope. As a flow of a program execution process in the seventh embodiment, the process illustrated in the flowchart of FIG. 8 may be adopted within a necessary scope.

In the seventh embodiment, the random selection unit 134 has a function for randomly selecting a game medium by changing a probability of random selection depending on at least part of information received according to a predetermined function for receiving information input of a player terminal.

In the seventh embodiment, in step S34, a game medium is randomly selected by changing a probability of random selection depending on at least part of information received according to a predetermined function for receiving information input of a player terminal.

As one aspect of the seventh embodiment, a game medium is randomly selected by changing a probability of random selection depending on at least part of information received according to a predetermined function for receiving information input, and thus it is possible to improve amusement of a game.

In the seventh embodiment, the "player terminal", the "player", the "computer apparatus", the "game", the "position information", the "position", the "first game information", the "second game information", the "game information", the "region", the "different position", the "game medium", the "information regarding a game medium", the "predetermined first condition", and the phrase "advancing a game", the contents described in the first embodiment can be adopted respectively within a necessary scope. In the seventh embodiment, the term "acquisition", the contents described in the second embodiment can be adopted within a necessary scope.

In the seventh embodiment, the "predetermined second condition", the "another-player information", and the "event", the contents described in the fourth embodiment can be adopted respectively within a necessary scope. In the seventh embodiment, the "interlocking another application program" and the term "access", the contents described in the fifth embodiment can be adopted respectively within a necessary scope.

In the seventh embodiment, the "at least part of received information" indicates, for example, a part or the whole of text included in received text information or an image included in image information. The phrase "changing a probability of random selection" may include, for example, changing a probability of random selection when a random selection target population is randomly selected from among a plurality of populations, changing a probability of random selection of a game medium included in a population, adding a predetermined game medium to a population, or deleting a predetermined game medium from a population (for example, a winning probability is set to 0%).

Eighth Embodiment

Next, a description will be made of a summary of an eighth embodiment of the present invention. Hereinafter, as the eighth embodiment, a description will be made of an example of a game system implemented by a player terminal operated by each player and a computer apparatus connectable to the player terminal through communication.

Figure 9:
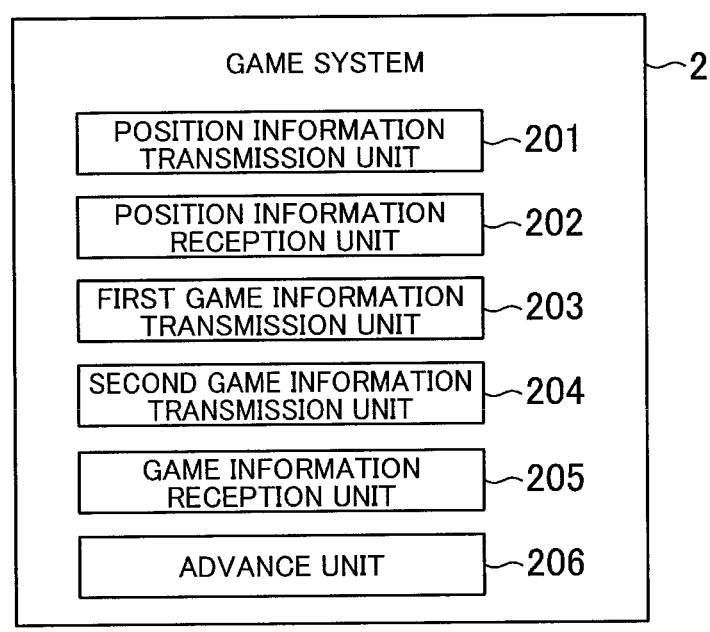
FIG. 9 is a block diagram illustrating a configuration of a game system, corresponding to at least one of embodiments of the present invention.

FIG. 9 is a block diagram illustrating a configuration of a game system, corresponding to at least one of embodiments of the present invention. A game system 2 includes at least a position information transmission unit 201, a position information reception unit 202, a first game information transmission unit 203, a second game information transmission unit 204, a game information reception unit 205, and an advance unit 206.

The position information transmission unit 201 has a function for transmitting position information regarding a position of a player terminal in the real world to a computer apparatus. The position information reception unit 202 has a function for receiving the position information transmitted from the position information transmission unit 201 in the computer apparatus. The first game information transmission unit 203 has a function for transmitting first game information corresponding to the position indicated by the position information received by the position information reception unit 202, to a player terminal.

The second game information transmission unit 204 has a function for transmitting second game information corresponding to a predetermined position in the real world that is different from the position indicated by the position information received by the position information reception unit 202, to the player terminal, in a case where a predetermined first condition is satisfied. The game information reception unit 205 has a function for receiving the first game information transmitted from the first game information transmission unit 203 and/or the second game information transmitted from the second game information transmission unit 204 in the player terminal. The advance unit 206 has a function for advancing a game on the basis of the first game information and/or the second game information received by the game information reception unit 205.

Figure 10:
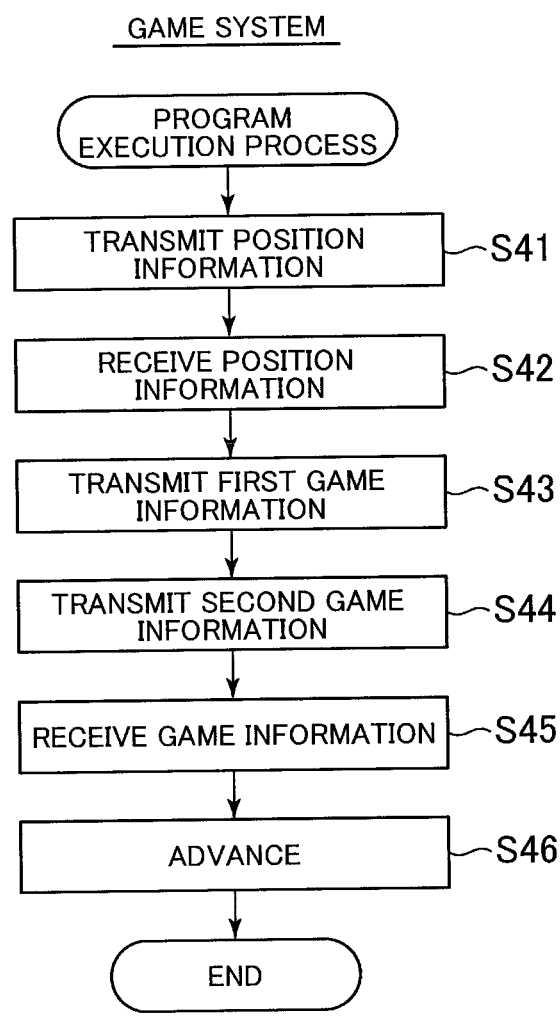
FIG. 10 is a flowchart illustrating a game execution process corresponding to at least one of the embodiments of the present invention.

Next, a description will be made of a program (game program) execution process in the eighth embodiment of the present invention. FIG. 10 is a flowchart illustrating a game execution process corresponding to at least one of the embodiments of the present invention.

The game system 2 transmits position information regarding a position of a player terminal in the real world to a computer apparatus (step S41). Next, the game system 2 receives the position information transmitted in step S41 in the computer apparatus (step S42). Next, the game system 2 transmits first game information corresponding to the position indicated by the position information received in step S42, to a player terminal (step S43).

The game system 2 transmits second game information corresponding to a predetermined position in the real world that is different from the position indicated by the position information received in step S42, to the player terminal, in a case where a predetermined first condition is satisfied (step S44). Next, the game system 2 receives the first game information transmitted in step S43 and/or the second game information transmitted in step S44 in the player terminal (step S45). Next, the game system 2 advances a game on the basis of the first game information and/or the second game information received in step S45 (step S46), and terminates the process.

As one aspect of the eighth embodiment, in a game using a position of a player terminal in the real world, it is possible to improve the satisfaction of a player who cannot perform sufficient movement in the real world.

In the eighth embodiment, the "player terminal", the "player", the "computer apparatus", the "game", the "position information", the "position", the "first game information", the "second game information", the "game information", the "region", the "different position", the "game medium", the "information regarding a game medium", the "predetermined first condition", and the phrase "advancing a game," the contents described in the first embodiment can be adopted respectively within a necessary scope.

Ninth Embodiment

Next, a description will be made of a summary of a ninth embodiment of the present invention. Hereinafter, as the ninth embodiment, a description will be made of an example of a game program executed in a player terminal in a game system implemented by the player terminal operated by each player and a computer apparatus connectable to the player terminal through communication.

Figure 11:
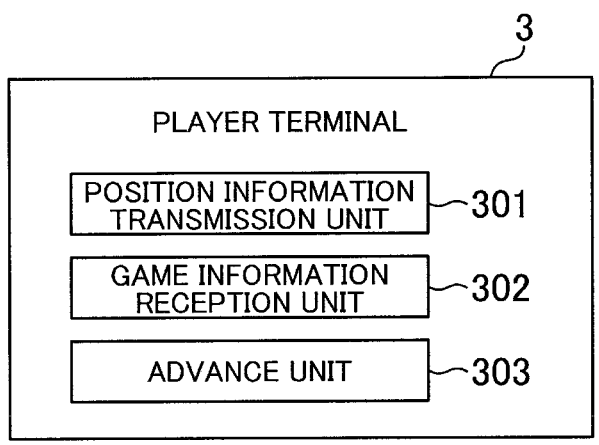
FIG. 11 is a block diagram illustrating a configuration of a player terminal corresponding to at least one of embodiments of the present invention.

FIG. 11 is a block diagram illustrating a configuration of a player terminal corresponding to at least one of embodiments of the present invention. A player terminal 3 includes at least a position information transmission unit 301, a game information reception unit 302, and an advance unit 303.

The position information transmission unit 301 has a function for transmitting position information regarding a position of the player terminal in the real world to a computer apparatus. The game information reception unit 302 has a function for receiving first game information and/or second game information transmitted from the computer apparatus. The advance unit 303 has a function for advancing a game on the basis of the first game information and/or the second game information received by the game information reception unit 302.

Figure 12:
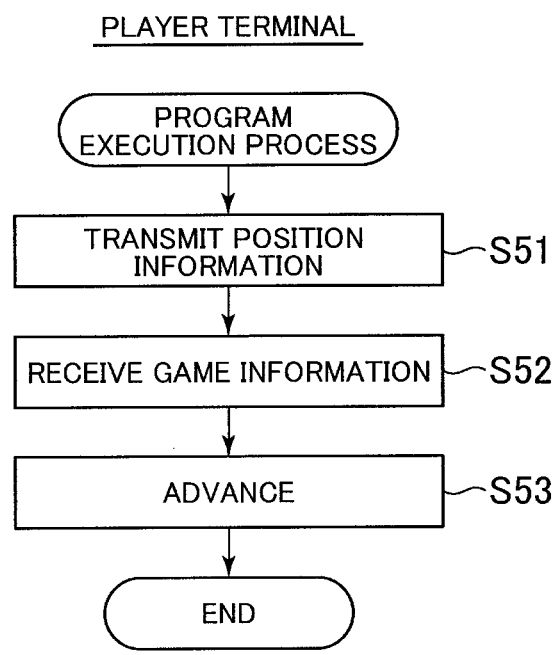
FIG. 12 is a flowchart illustrating a program execution process corresponding to at least one of embodiments of the present invention.

Next, a description will be made of a program (game program) execution process in the ninth embodiment of the present invention. FIG. 12 is a flowchart illustrating a program execution process corresponding to at least one of embodiments of the present invention.

The player terminal 3 transmits position information regarding a position of the player terminal in the real world to a computer apparatus (step S51). Next, the player terminal 3 receives first game information and/or second game information transmitted from the computer apparatus (step S52). Next, the player terminal 3 advances a game on the basis of the first game information and/or the second game information received in step S52 (step S53), and terminates the process.

The game system receives the position information regarding the position of the player terminal 3 in the real world from the player terminal. The game system transmits the first game information corresponding to the position indicated by the received position information, to the player terminal 3. The game system transmits the second game information corresponding to a predetermined position in the real world that is different from the position indicated by the position information received from the player terminal 3, to the player terminal 3, in a case where a predetermined first condition is satisfied.

As one aspect of the ninth embodiment, in a game using a position of a player terminal in the real world, it is possible to improve satisfaction of a player who cannot perform sufficient movement in the real world.

In the ninth embodiment, the "player terminal", the "player", the "computer apparatus", the "game", the "position information", the "position", the "first game information", the "second game information", the "game information", the "region", the "different position", the "game medium", the "information regarding a game medium", the "predetermined first condition", and the phrase "advancing a game", the contents described in the first embodiment can be adopted respectively within a necessary scope.

Tenth Embodiment

Next, a description will be made of a summary of a tenth embodiment of the present invention. Hereinafter, as the tenth embodiment, a description will be made of an example of a game system implemented by a player terminal operated by each player and a computer apparatus connectable to the player terminal through communication.

Figure 13:
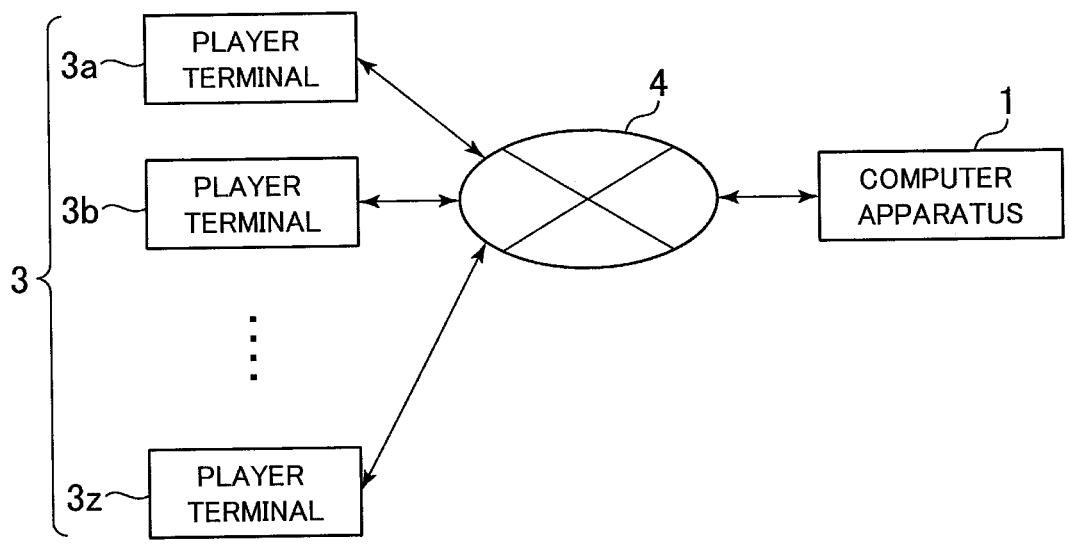
FIG. 13 is a block diagram illustrating a configuration of a system, corresponding to at least one embodiment of the invention.

FIG. 13 is a block diagram illustrating a configuration of a system, corresponding to at least one embodiment of the invention. As illustrated, the game system 2 is configured with the computer apparatus 1, a communication network 4, and a plurality of player terminals 3 (3a, 3b, 3z) operated by individual players. The computer apparatus 1 is connected to the player terminals 3 through the communication network 4. The computer apparatus 1 may not be constantly connected to the player terminals 3 or may be able to be connected as necessary.

Figure 14:
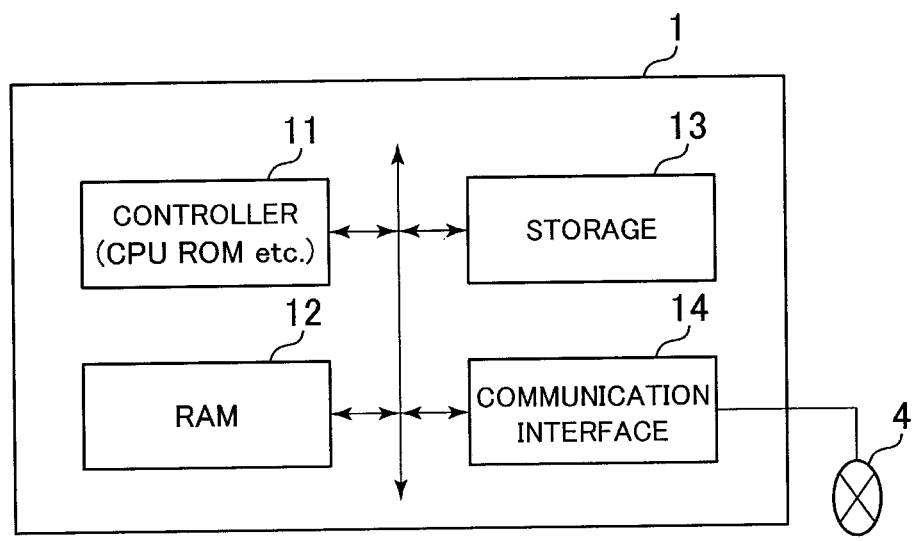
FIG. 14 is a block diagram illustrating a configuration of the computer apparatus, corresponding to at least one embodiment of the present invention.

FIG. 14 is a block diagram illustrating a configuration of the computer apparatus, corresponding to at least one embodiment of the present invention. The computer apparatus 1 includes at least a controller 11, a random access memory (RAM) 12, a storage 13, and a communication interface 14 that are connected to each other through an internal bus.

The controller 11 is configured with a central processing unit (CPU) and a read only memory (ROM), executes a program stored in the storage 13, and controls the computer apparatus 1. In addition, the controller 11 includes an internal timer that tracks time. The RAM 12 is a work area of the controller 11. The storage 13 is a storage region for storing the program (including a game program) and data (including game data). The controller 11 reads the program and the data from the RAM 12 and performs a program execution process based on information and the like received from the player terminals 3.

The communication interface 14 can be connected to the communication network 4 in a wireless or wired manner and can transmit and receive data through the communication network 4. For example, data received through the communication interface 42 is loaded into the RAM 12 and is subjected to a calculation process by the controller 11.

Figure 15:
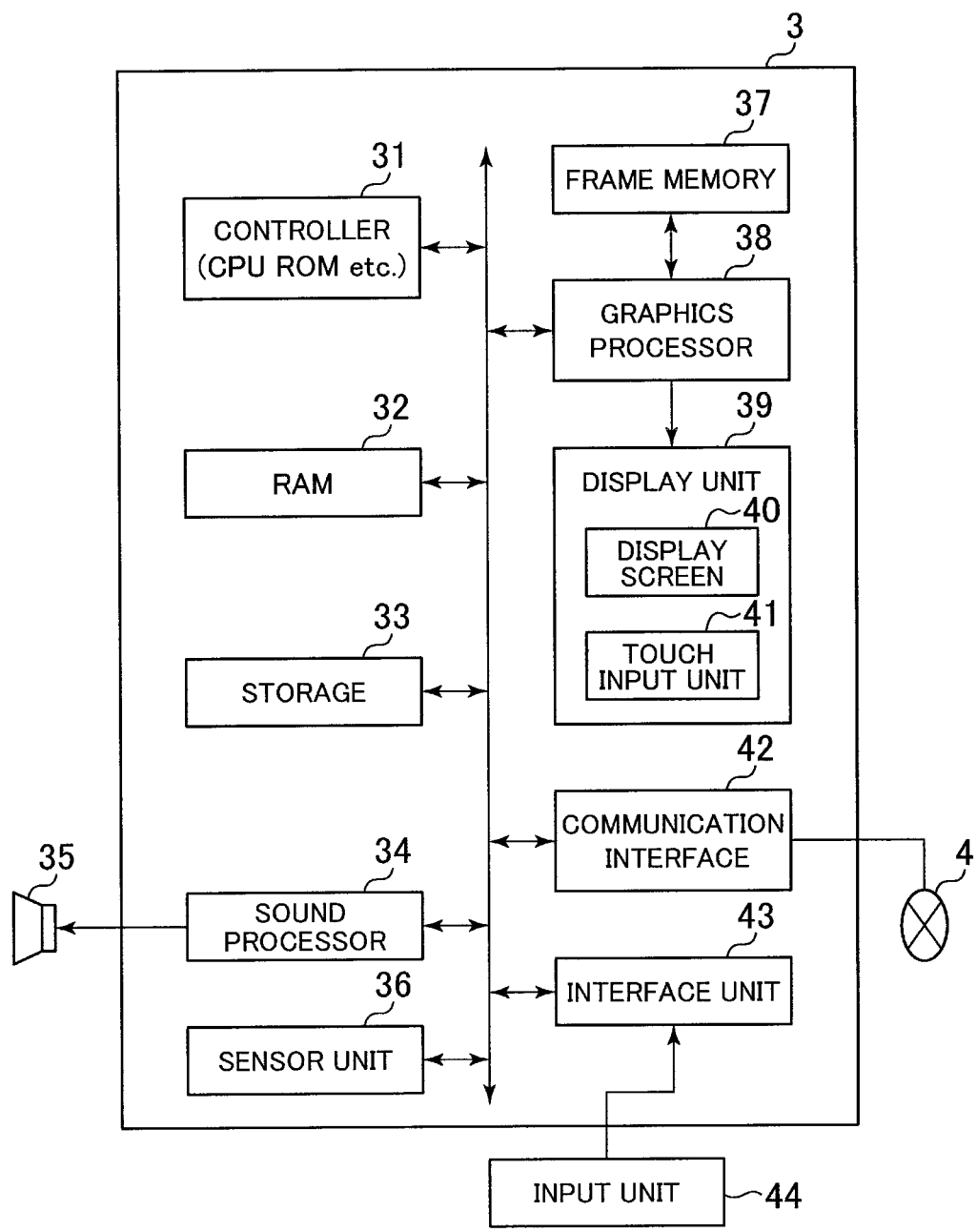
FIG. 15 is a block diagram illustrating a configuration of the player terminal, corresponding to at least one embodiment of the present invention.

FIG. 15 is a block diagram illustrating a configuration of the player terminal, corresponding to at least one embodiment of the present invention. The player terminal 3 includes at least a controller 31, a RAM 32, a storage 33, a sound processor 34, a sensor unit 36, a graphics processor 38, a display unit 39, a communication interface 42, and an interface unit 43 that are connected to each other through an internal bus.

The controller 31 is configured with a CPU and a ROM. The controller 31 executes a program stored in the storage 33 and controls the player terminal 3. The RAM 32 is a work area of the controller 31. The storage 33 is a storage region for storing the program and data.

The controller 31 reads a program and data from the RAM 32 and processes the program and the data. By processing the program and the data loaded in the RAM 32, the controller 31 outputs a sound output instruction to the sound processor 34 and outputs an image rendering instruction to the graphics processor 38.

The sound processor 34 is connected to a sound output device 35 that is a speaker. In a case where the controller 31 outputs the sound output instruction to the sound processor 34, the sound processor 34 outputs a sound signal to the sound output device 35.

The sensor unit 36 includes a GPS sensor. In addition, the sensor unit 36 may include various other sensors. For example, various sensors are exemplified by a fingerprint authentication sensor, a proximity sensor, an acceleration sensor, a gyro sensor, a magnetic force sensor, a brightness sensor, or an air pressure sensor.

The graphics processor 38 is connected to the display unit 39. The display unit 39 includes a display screen 40. In a case where the controller 31 outputs the image rendering instruction to the graphics processor 38, the graphics processor 38 loads an image into a frame memory (frame buffer) 37 and outputs a video signal for displaying the image on the display screen 40. The display unit 39 may be a screen of a touch panel including a touch input unit 41.

The graphics processor 38 renders one image in frame units. For example, a time of one frame of the image is 1/30 seconds. The graphics processor 38 distributes the load of the whole system by performing a part of a calculation process related to image rendering performed by only the controller 31.

The communication interface 42 can be connected to the communication network 4 in a wireless or wired manner and can transmit and receive data through the communication network 4. Data received through the communication interface 42 is loaded into the RAM 32 and is subjected to a calculation process by the controller 31 in the same manner as data read from an external memory.

An input unit 44 (for example, a mouse or a keyboard) may be connected to the interface unit 43. Input information provided by the player from the input unit 44 is stored in the RAM 32, and the controller executes various calculation processes based on the input information. Alternatively, a storage medium reading device can be connected to the interface unit 43, and a program, data, and the like can be read from the external memory. In addition, the display unit 39 including a touch panel can be used as the input unit 44.

Figure 16:
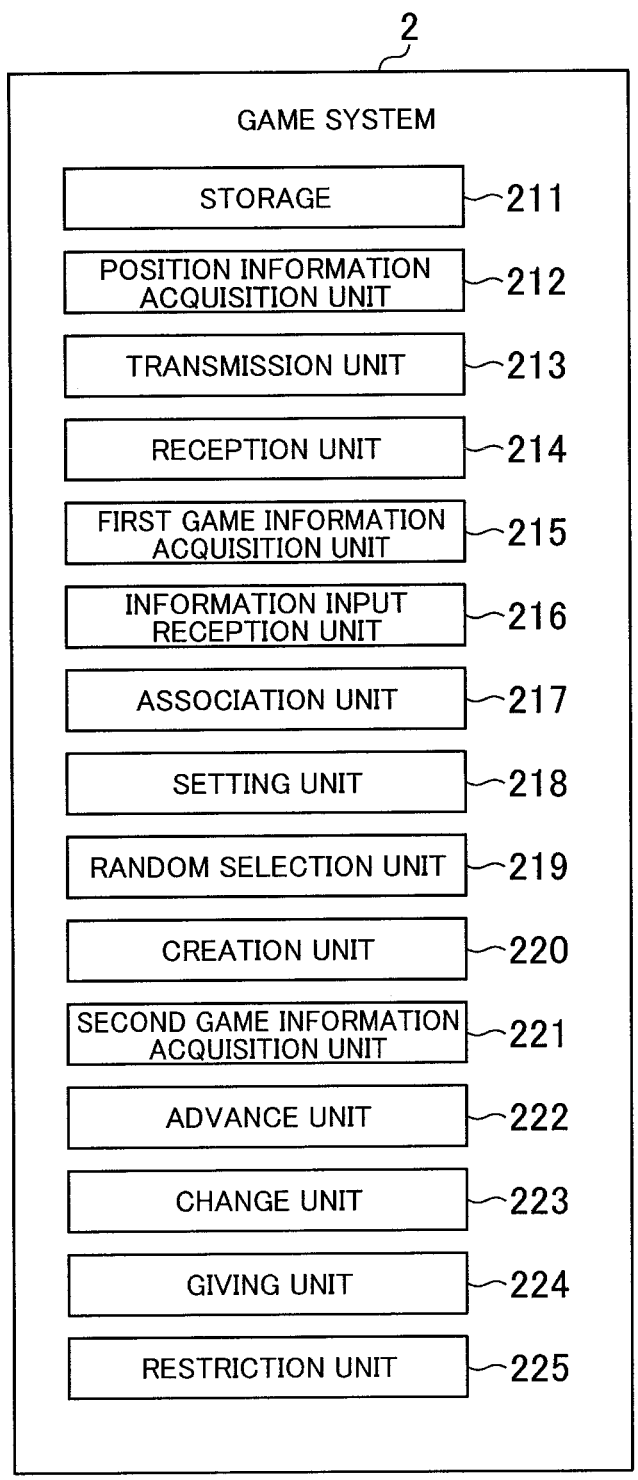
FIG. 16 is a block diagram illustrating a configuration of a game system, corresponding to at least one of embodiments of the present invention.

FIG. 16 is a block diagram illustrating a configuration of a game system, corresponding to at least one of embodiments of the present invention. A game system 2 includes at least a storage 211, a position information acquisition unit 212, a transmission unit 213, a reception unit 214, a first game information acquisition unit 215, an information input reception unit 216, an association unit 217, a setting unit 218, a random selection unit 219, a creation unit 220, a second game information acquisition unit 221, an advance unit 222, a change unit 223, a giving unit 224, and a restriction unit 225.

The storage 211 has a function for storing information regarding a game medium group including a plurality of game media in association with positions or regions in the real world. The respective regions may have locations overlapping each other. The storage 211 preferably stores information for displaying a map corresponding to at least one some of the positions or the regions on a player terminal. Information regarding the map may be stored in the player terminal.

The information regarding a game medium group preferably includes an appearance probability of each game medium. The appearance probability is preferably set, for example, according to an attribute (for example, the degree of rarity) set in a game medium. For example, as the degree of rarity of a game medium becomes higher, the appearance probability is preferably set to become lower.

The position information acquisition unit 212 has a function for acquiring position information regarding a position of a player terminal in the real world. Acquisition of position information is preferably performed by measuring the position information by using, for example, a GPS sensor provided in the player terminal or a wireless network system of the player terminal. The position information is acquired as, for example, a specific point coordinate.

The transmission unit 213 includes a transmission unit 213*a* provided in the player terminal 3 and a transmission unit 213*b* provided in the computer apparatus 1. The transmission unit 213*a* has a function for transmitting information regarding a game from the player terminal 3 to the computer apparatus 1. For example, position information of the player terminal acquired by the position information acquisition unit 212, information regarding a game play situation, and information received by the information input reception unit 216 are transmitted to the computer apparatus 1 by the transmission unit 213*a*.

The transmission unit 213*b* has a function for transmitting information regarding a game from the computer apparatus 1 to the player terminal 3. For example, information (first game information) regarding a game medium group or a map corresponding to a position or a region indicated by position information of the player terminal 3, information (second game information) regarding a game medium group or a map corresponding to a predetermined position set by the setting unit 218 or a region including the predetermined position, and information regarding a game medium randomly selected by the random selection unit 219 are transmitted to the player terminal 3 by the transmission unit 213*b*.

The reception unit 214 includes a reception unit 214*a* provided in the player terminal 3 and a reception unit 214*b* provided in the computer apparatus 1. The reception unit 214*a* has a function for receiving information regarding a game transmitted from the computer apparatus 1 to the player terminal 3 by the transmission unit 213*b*. The reception unit 214*b* has a function for receiving information regarding a game transmitted from the player terminal 3 to the computer apparatus 1 by the transmission unit 213*a*.

The first game information acquisition unit 215 has a function for acquiring information regarding a game medium group corresponding to a position indicated by position information of the player terminal received by the reception unit 214*b* or a region including the position, from the storage 211. The first game information acquisition unit 215 preferably acquires information regarding a map corresponding to a position indicated by position information of the player terminal or at least a part of a region including the position along with the information regarding a game medium group, from the storage 211.

The information input reception unit 216 has a function for receiving input of predetermined information from a player. The information input reception unit 216 is preferably controlled to be able to receive an input on the basis of, for example, a predetermined probability. The predetermined information may be, for example, text information such as comments of a player on a game, or information regarding an image captured or selected by the player, but is not limited thereto, and may be set as appropriate depending on a genre or a content of a game.

The input of the predetermined information from the player may be received by a game program for a player terminal corresponding to a game program installed in the computer apparatus 1, and may be received by another application program interlocking with the game program for the player terminal.

The association unit 217 has a function for associating player information regarding a player with another-player information regarding another player. The association unit 217 updates the player information such that the player information is associated with another-player information, for example, in a case where the player and another player make friends with each other, or belong to an identical guild (team) or party.

The setting unit 218 has a function for setting a predetermined position on the basis of another-player information regarding another player or an event content in a game in a case where a predetermined second condition is satisfied. For example, in a case where information received by the information input reception unit 216 is received by the computer apparatus 1, the setting unit 218 preferably sets a predetermined position on the basis of position information included in information transmitted from another player terminal.

The setting unit 218 may set a predetermined position on the basis of, for example, a content of an event held in a game. For example, in a case of holding an event in which a predetermined region of the real world is correlated with a virtual space, and the predetermined region of the real world is virtually searched, the setting unit 218 preferably sets a position of a landmark present in the predetermined region as a predetermined position. Specifically, in a case of holding an event of virtually searching Minato-ku, Tokyo, a position of Tokyo Tower or the like may be set as a predetermined position. In a case of holding an event of virtually searching Washington D.C. of the U.S.A., a position of the White House may be set as a predetermined position.

The random selection unit 219 has a function for randomly selecting a game medium in a case where information received by the information input reception unit 216 is received by the computer apparatus 1. For example, the random selection unit 219 randomly selects one or more game media from a population including a plurality of game media that are random selection targets on the basis of a predetermined probability of random selection. For example, the random selection unit 219 may be configured to randomly select one population from among a plurality of populations on the basis of a predetermined probability of random selection prior to random selection of a game medium.

The random selection unit 219 preferably changes a probability of random selection on the basis of at least part of information that is received by the information input reception unit 216 and is received by the computer apparatus 1. A specific aspect regarding changing of a probability of random selection will be described later.

The creation unit 220 has a function for creating predetermined information on the basis of information that is received by the information input reception unit 216 and is received by the computer apparatus 1. The creation unit 220 creates, for example, predetermined return information on the basis of an analysis result of text information such as a comment or image information received by the information input reception unit 216. The creation unit 220 preferably creates a return comment to include at least a part of a character string included in the text information or the image information or to include a character string corresponding to at least a part of the character string included in the text information or the image information.

Analysis of text information is preferably performed according to, for example, morpheme analysis. A character string included in image information is a character string recognized to be included in an image, for example, when the image is subjected to image analysis. For example, the character string included in image information also includes a character string obtained in a case where an image such as a two-dimensional code is converted according to a predetermined rule.

The predetermined return information created by the creation unit 220 is preferably configured to be accessible from the player and another player in a game or via other application programs. The predetermined return information created by the creation unit 220 is preferably attached with link information enabling information regarding a game medium randomly selected by the random selection unit 219 or information regarding a predetermined position set by the setting unit 218 to be acquired. For example, the player or another player accesses the link information so as to be able to acquire a game medium randomly selected by the random selection unit 219 or to advance a game on the basis of the second game information.

The second game information acquisition unit 221 has a function for acquiring information regarding a game medium group corresponding to a predetermined position set by the setting unit 218 or a region including the predetermined position, from the storage 211 in a case where a predetermined first condition is satisfied. The second game information acquisition unit 221 preferably acquires, from the storage 211, information regarding a map corresponding to a predetermined position set by the setting unit 218 or at least a part of a region including the predetermined position along with information regarding a game medium group.

The advance unit 222 has a function for advancing a game in the player terminal on the basis of the first game information and/or the second game information received by the reception unit 214a. In a case where the game is advanced on the basis of the first game information, for example, it is preferable that a map corresponding to the current position of the player terminal is displayed on the player terminal, and a game medium appearing during advancing of the game appears in correspondence with the current position of the player terminal. In a case where the game is advanced on the basis of the second game information, it is preferable that a map corresponding to a predetermined position set by the setting unit 218 is displayed on the player terminal, and a game medium appearing during advancing of the game appears in correspondence with the predetermined position.

In a case where the game is advanced on the basis of the first game information and the second game information, it is preferable that any one of a map corresponding to the current position of the player terminal, a map corresponding to a predetermined position set by the setting unit 218, and a predetermined map of a virtual world is displayed on the player terminal, and both of a game medium corresponding to the current position of the player terminal and a game medium corresponding to the predetermined position appear during game advancing. Preferably, the player can select which game information is used to advance the game.

The change unit 223 has a function for changing a predetermined position set by the setting unit 218 according to movement of a position of the player terminal in the real world in a case where the player terminal advances the game on the basis of the second game information. The changing of a predetermined position may be performed, for example, by storing, in the storage 211, a correction value (for example, differences between latitudes and longitudes of a real position and a predetermined position) for converting position information regarding the real position of the player terminal when game advancing based on the second game information is started into position information regarding the predetermined position set by the setting unit 218, and by converting position information regarding a real position of the player terminal acquired after game advancing based on the second game information is started by using the correction value.

In a case where the predetermined position is changed by the change unit 223, the second game information acquisition unit 221 acquires game information (hereinafter, also referred to as "third game information") regarding a game medium or the like corresponding to the changed predetermined position or a region including the changed predetermined position. In a case where the predetermined position is changed by the change unit 223, the advance unit 222 displays a map corresponding to the predetermined position changed by the change unit 223 on the basis of the third game information, and advances the game such that a game medium corresponding to the changed predetermined position appears.

The giving unit 224 has a function for giving a game medium randomly selected by the random selection unit 219 or a game medium caused to appear by the advance unit 222 to the player. For example, in a case where the player has cleared a mini game or a virtual battle for acquiring such a game medium, the giving unit 224 preferably gives the game medium to the player.

The restriction unit 225 has a function for providing a restriction in time for which the player terminal can advance the game on the basis of the second game information. The restriction unit 225 disables game advancing based on the second game information, for example, in a case where a predetermined time has elapsed from the time at which a predetermined position is set by the setting unit 218 or the time at which the player can use the second game information corresponding to the predetermined position. The predetermined time may be set as appropriate, for example, 10 minutes, 30 minutes, or an hour, according to a genre or a content of a game.

Next, a description will be made of a game execution process in the tenth embodiment of the present invention. Hereinafter, as an example of a game, a description will be made of a role playing game in which a game is advanced by using position information of a player terminal and a game medium owned by a player (available to the player). A genre of a game is not limited to the role playing game, and the present invention may be applied to any genre such as a simulation game or an action game.

Statuses (for example, an offensive power, a defensive power, and the maximum hit point) used for a game or a skill having a predetermined effect is set in a game medium. A player selects any game medium from among owned game media, and performs, for example, a mini game or a virtual battle with an opponent character or another player in order to acquire a game medium. A result of the mini game or victory or defeat of the virtual battle is determined on the basis of a status or a skill set in the game medium. The degree of rarity is also set in a game medium. As a game medium has a higher degree of rarity, it is preferable that the game medium is a rarer medium in a game, and a probability of random selection (appearance probability) is set to become lower. A status used for a game is preferably set to be higher in a game medium having a higher degree of rarity than in a game medium having a lower degree of rarity.

Information regarding a game medium group including a plurality of game media is stored in a storage 13 of the computer apparatus in association with a region of the real world. The information regarding a game medium group includes information regarding an appearance probability of each game medium. The computer apparatus stores information regarding a map corresponding to at least a part of a region of the real world. Information regarding a game medium owned by a player is managed as, for example, player information by the computer apparatus or the player terminal, and, when the game medium is given to the player, the player information is updated such that information regarding the given game medium is included in the player information.

Figure 17:
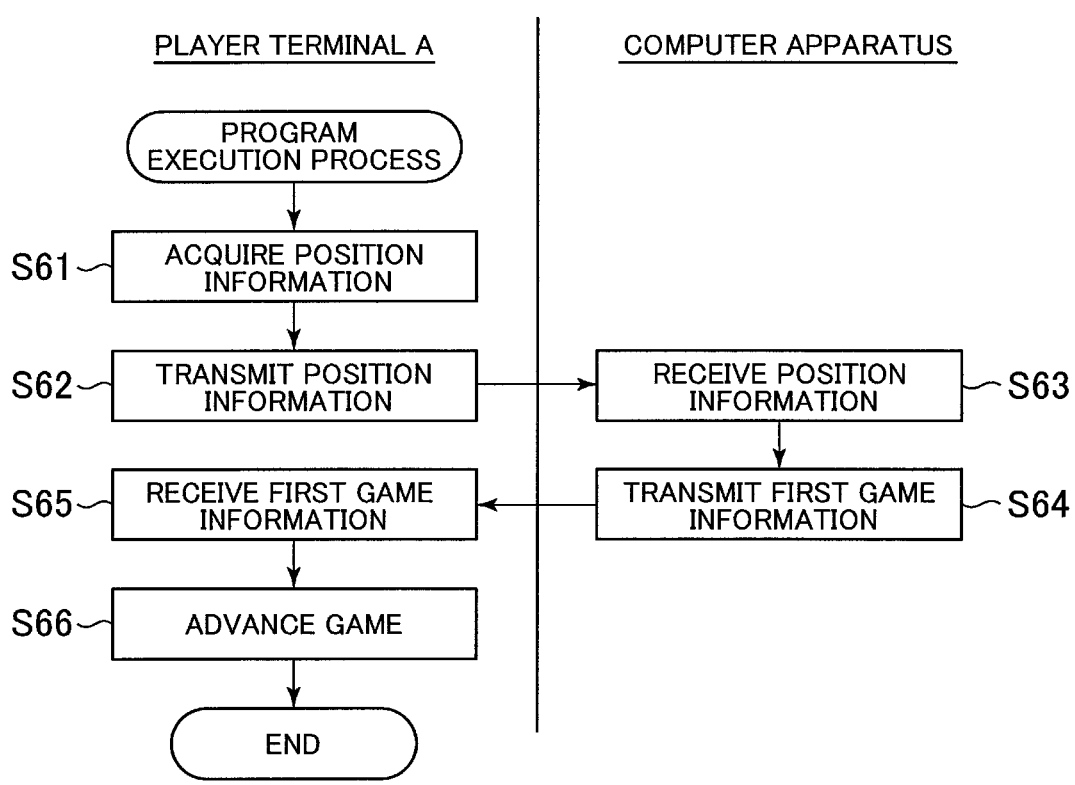
FIG. 17 is a flowchart illustrating a game execution process corresponding to at least one of embodiments of the present invention.

FIG. 17 is a flowchart illustrating a game execution process corresponding to at least one of embodiments of the present invention. FIG. 17 is a flowchart illustrating a game execution process based on, for example, the first game information.

First, a player terminal A acquires position information regarding a position of the player terminal A in the real world (step S61). Acquisition of the position information is performed by measuring the position information by using, for example, a GPS sensor provided in the player terminal A or a wireless network system of the player terminal. Next, the player terminal A transmits the position information acquired in step S61 to the computer apparatus 1 (step S62).

Next, the computer apparatus 1 receives the position information of the player terminal A from the player terminal A (step S63). Next, the computer apparatus 1 acquires, from the storage 13 of the computer apparatus 1, information regarding a game medium group corresponding to a region including a position indicated by the received position information and information regarding a map corresponding to at least a part of the region, and transmits the acquired information as the first game information to the player terminal A (step S64).

Next, the player terminal A receives the first game information transmitted in step S64 (step S65). Next, the player terminal A advances a game on the basis of the first game information received in step S65 (step S66), and terminates the process. In step S66, for example, it is preferable that a map including the position of the player terminal A in the real world is displayed, and at least one game medium is caused to appear on the basis of the information regarding a game medium group included in the first game information.

Figure 18:
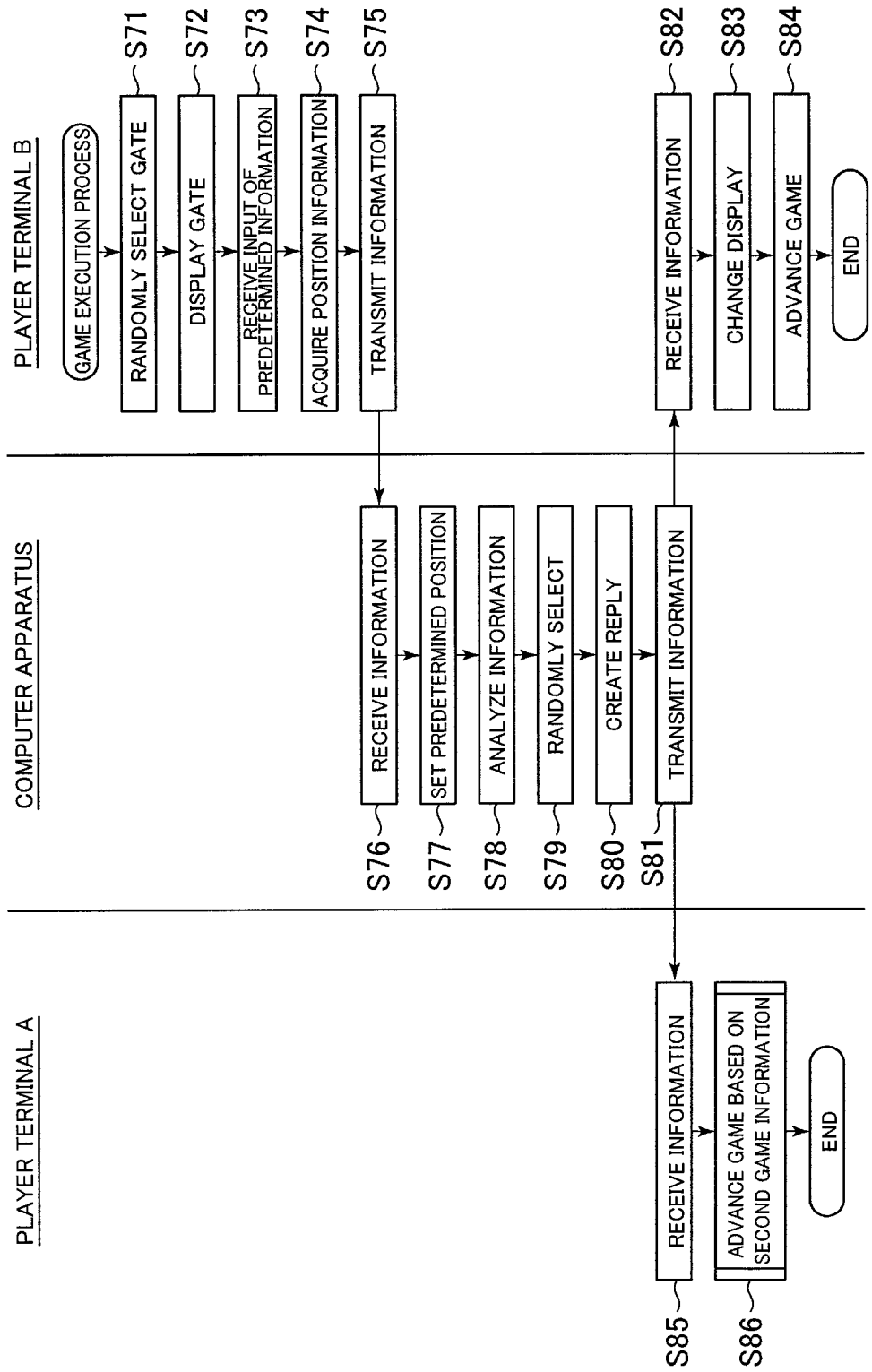
FIG. 18 is a flowchart illustrating a game execution process corresponding to at least one of embodiments of the present invention.

FIG. 18 is a flowchart illustrating a game execution process corresponding to at least one of embodiments of the present invention. FIG. 18 is a flowchart illustrating a game execution process regarding, for example, setting of a predetermined position.

First, in a player terminal B, it is randomly selected whether or not a gate is to be caused to appear on the basis of a predetermined probability of random selection at a predetermined timing during advancing of a game based on the first game information (step S71). As will be described later in detail, the appearance of the gate is a trigger for another player to advance a game on the basis of the second game information, that is, for another player to advance the game by using game information corresponding to a position different from a position of the another player terminal.

A timing of gate random selection may be set as appropriate according to a genre or a content of a game, but the gate random selection is preferably performed when a game based on the first game information is started or whenever a predetermined time elapses from starting of the game. As described above, whether or not the gate is caused to appear is determined through random selection and/or the random selection is performed at a predetermined timing, and thus it is possible to appropriately restrict game advancing based on the second game information. As a result, it is possible to realize, with good balance, the concept of a game using position information of one's own player terminal and achievement of the object of improving satisfaction of a player who cannot perform sufficient movement in the real world.

In a case where the gate is won in the random selection in step S71, the player terminal B displays an image of the gate on a display screen (step S72). A display position of the image of the gate is not particularly limited, but the image of the gate may be displayed at a predetermined position (for example, a screen center) on the display screen at all times regardless of movement of the player terminal B.

Regarding a display position of the gate image, for example, the gate image may be correlated with a predetermined position on a map displayed on the display screen. In a case of the above configuration, it is preferable that position information regarding the predetermined position at which the gate image is displayed is acquirable from map information, and position information transmitted in step S75 which will be described later and a predetermined position set in step S77 are based on the predetermined position at which the gate image is displayed.

Next, when an operation of selecting the gate image is performed in the player terminal B, the player terminal B receives input of predetermined information from a player B operating the player terminal B (step S73). In step S73, the player B may input, for example, a comment, or may selectively input an image captured by the player terminal B or an image stored in the player terminal B.

Step S73 may be executed by a function provided in a game program, and may be executed by another application program interlocking with the game program. In a case where step S73 is executed by the function provided in the game program, it is preferable that, for example, another player having a predetermined relationship such as friends with the player B who is an input person is notified of the input predetermined information and can thus view the information.

In a case where step S73 is executed by another application program, it is preferable that, for example, the another application program is configured to be started in response to an operation of selecting the gate image in the player terminal B. Preferably, the input predetermined information is viewable not only by another player different from the player B who is an input person but also by a person who is not playing the game, via another application program.

In a case where another application program is used, the information of which input is received in step S73 is viewable via another application program. In other words, since people not using a game related to the present embodiment can also view the information, such people can be interested in the game related to the present embodiment.

Next, the player terminal B acquires position information indicating a position of the player terminal B in the real world (step S74). Next, the player terminal B transmits the information that is received in step S73 and the position information acquired in step S74 to the computer apparatus 1 (step S75). In step S75, for example, the predetermined information received in step S73 and the position information of the player terminal B acquired in step S74 are associated with each other and are transmitted to the computer apparatus 1 together. The position information of the player terminal B acquired in step S74 is preferably position information of the player terminal B, for example, when predetermined information is transmitted in step S75.

In a case where another application program is used in step S73, transmission and reception of the predetermined information received in step S73 and transmission and reception of a return comment created in step S80 which will be described later may be performed in a management server of another application program.

Figure 19:
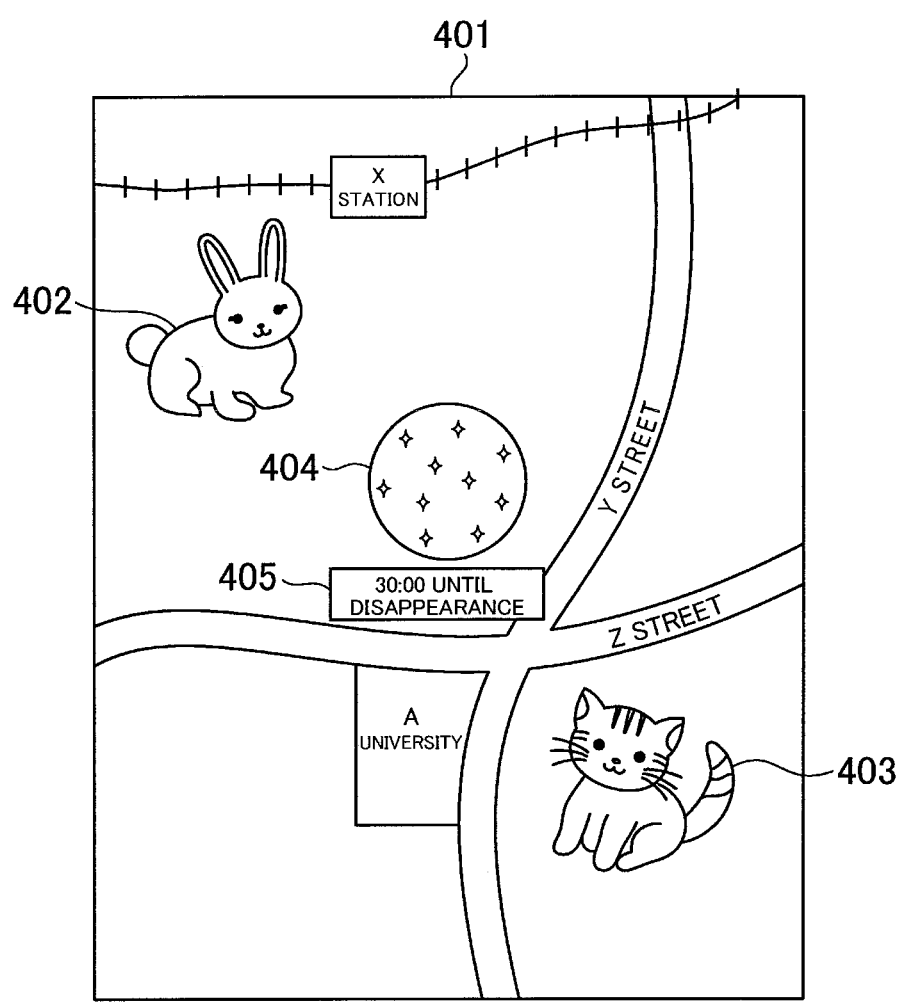
FIG. 19 is an example of a display screen displayed on a player terminal, corresponding to at least one embodiment of the present invention.
Figure 20:
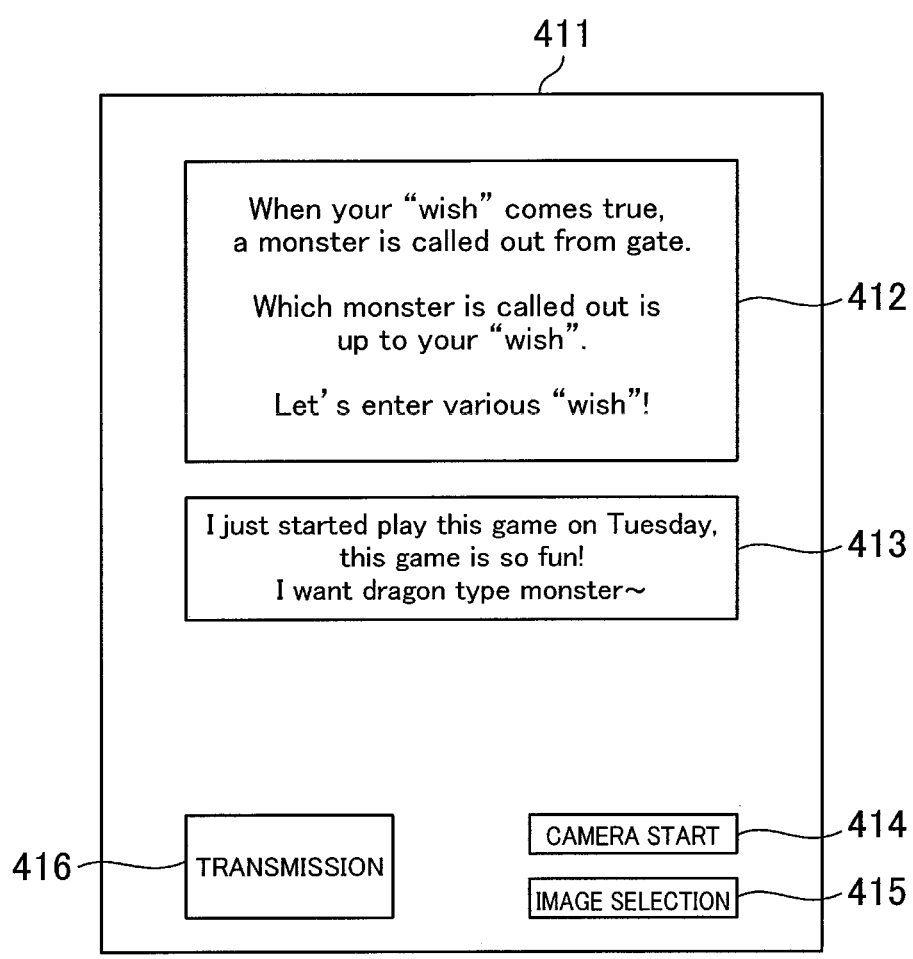
FIG. 20 is an example of a display screen displayed on a player terminal, corresponding to at least one embodiment of the present invention.

Hereinafter, with reference to FIGS. 19 and 20, the game execution process in steps S71 to S75 will be described in more detail. FIGS. 19 and 20 illustrate examples of display screens displayed on the player terminal, corresponding to at least one of the embodiments of the present invention.

FIG. 19 illustrates an example of a display screen 40 of the player terminal 3 in a case where a gate is won in random selection. A game execution screen 401 is displayed in the display screen 40 of the player terminal 3. In the game execution screen 401, game medium images 402 and 403, a gate image 404, and a restriction time display field 405 are displayed on a map corresponding to a position of the player terminal 3 in the real world. From the viewpoint of improving a player's convenience, the map displayed on the display screen 401 is preferably changeable in scale through, for example, a pinch operation or a button operation on a touch panel.

The game medium images 402 and 403 are images of game media appearing on the basis of the first game information, that is, game information corresponding to a region including a position of the player terminal 3 in the real world. For example, the game medium images 402 and 403 are preferably images of game media selected as a result of randomly selecting game media in the player terminal 3 on the basis of an appearance probability of a game medium included in the first game information. In a case where the player performs an operation of selecting the game medium image 402 or 403, for example, transition to a mini game or the like for acquiring the selected game medium occurs. The player may acquire the selected game medium according to a result of the mini game or the like.

The gate image 404 is displayed in a case where the gate is won in random selection in step S71. A display position of the gate image 404 is not particularly limited, but is preferably around the center of the display screen 401 from the viewpoint of the player easily recognizing display of the gate. In a case where the player performs an operation of selecting the gate image 404, input of the predetermined information can be received in step S73. The restriction time display field 405 indicates a time left until the gate image 404 disappears. In a case where the restriction time indicated in the restriction time display field 405 has elapsed, the gate randomly selected in step S71 disappears, and input of predetermined information based on the gate cannot be performed.

FIG. 20 illustrates an example of the display screen 40 of the player terminal 3 for receiving input of predetermined information. An information input execution screen 411 is displayed in the display screen 40 of the player terminal 3. A guide field 412, a comment input field 413, a camera start button 414, an image selection button 415, and a transmission button 416 are displayed in the information input execution screen 411.

The guide field 412 is provided to guide an operation to be operated by a player. A display content of the guide field 412 may be set as appropriate according to a genre or a content of a game. The comment input field 413 is a field used for a player to input a comment. For example, in a case where the player performs an operation of selecting the comment input field 413, a user interface is displayed in the information input execution screen 411 in order to input text, and thus a comment can be input.

The camera start button 414 is a button used to start a camera function provided in the player terminal 3. The image selection button 415 is a button used to select an image from among images stored in the player terminal 3. An image selected from among images captured by the started camera or images stored in the player terminal may be transmitted alone or along with, for example, the comment that is input to the comment input field 413, to the computer apparatus 1 as the predetermined information in step S73.

The transmission button 416 is a button used to transmit the comment input to the comment input field 413 and/or the captured or selected image to the computer apparatus 1. In a case where the transmission button 416 is selected, information regarding the comment input by the player and/or the image and position information regarding a position of the player terminal 3 in the real world are transmitted to the computer apparatus 1.

The flowchart of FIG. 18 will be referred to again. The computer apparatus 1 receives the information transmitted in step S75 (step S76). Next, the computer apparatus 1 sets a predetermined position on the basis of the position information included in the information received in step S76 (step S77). The predetermined position is preferably set on the basis of, for example, the position information of the player terminal B in the real world, acquired in step S74.

The computer apparatus 1 analyzes the predetermined information received in step S76 (step S78). In step S78, preferably, it is determined whether or not a keyword set in the computer apparatus 1 in advance is included by analyzing, for example, the comment input by the player or the image.

Next, the computer apparatus 1 changes a probability of random selection on the basis of the information analyzed in step S78, and randomly selects a game medium on the basis of the changed probability of random selection (step S79). In step S79, for example, it is preferable that a random selection table for game media is changed, or a probability of random selection of a predetermined game medium is increased or decreased, on the basis of the keyword included in the comment input by the player or the image. With this configuration, for example, the enjoyment of guessing a set keyword occurs in input of the predetermined information in step S73, and thus it is possible to improve the amusement of a game.

Figure 21:
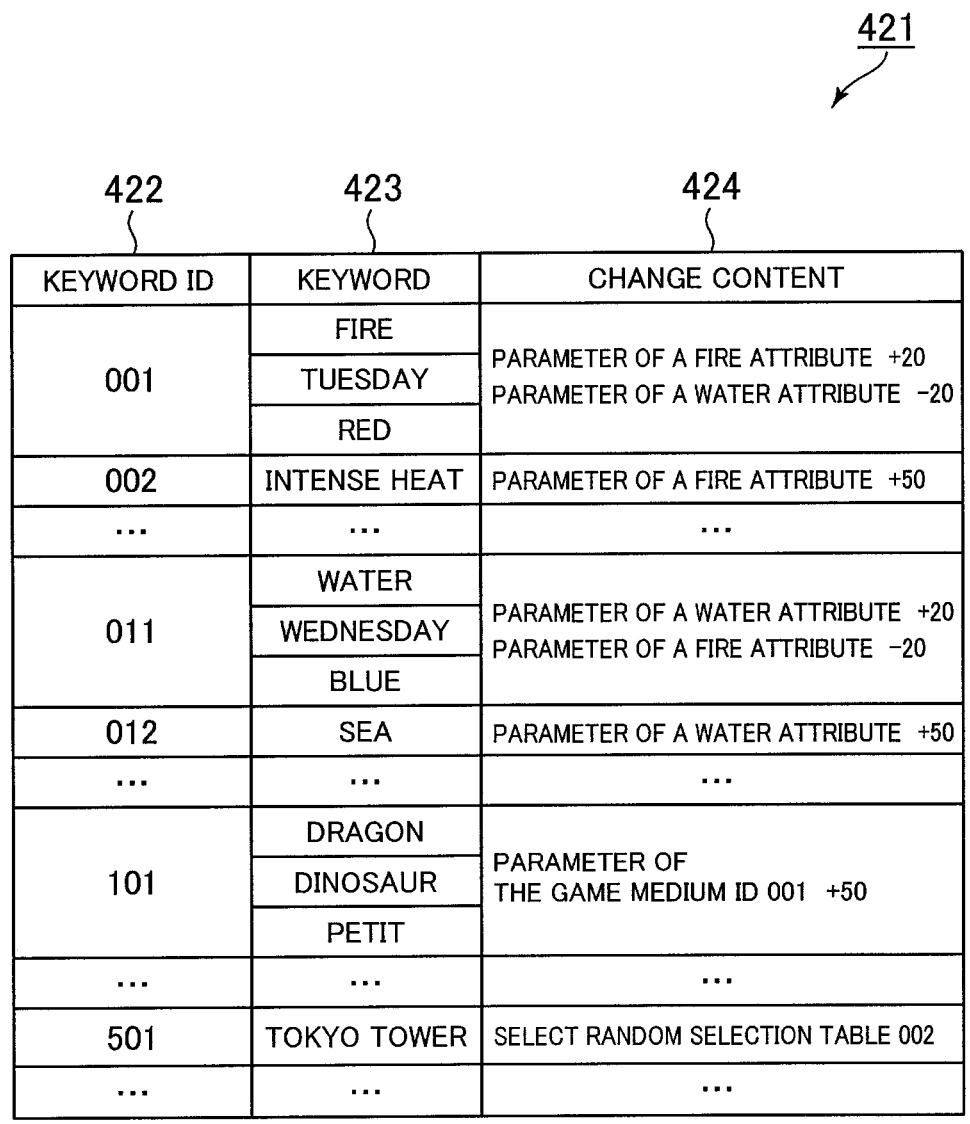
FIG. 21 is an example of a master table regarding a keyword, corresponding to at least one of the embodiments of the present invention.

Hereinafter, with reference to FIGS. 21 and 22, the game execution process in steps S78 and S79 will be described in more detail. FIG. 21 is an example of a master table regarding a keyword, corresponding to at least one of the embodiments of the present invention.

A keyword 423 and a change content 424 are stored in a master table 421 in association with a keyword ID 422 for identifying a keyword. The master table 421 is only an example, and may include other information. The other information may be, for example, priority orders among a plurality of keyword IDs. The master table 421 is preferably stored in the storage 13 of the computer apparatus.

The keyword 423 indicates a keyword for changing a probability of random selection. The change content 424 indicates a change content in a case where the keyword is included. For example, in a case where any one of keywords such as "fire", "Tuesday", and "red" is included in analyzed information, a parameter of a fire attribute game medium is set to "+20", a parameter of a water attribute game medium is set to "−20", and then random selection is executed. For example, any one of keywords such as a "dragon", a "dinosaur", and "petit" is included in analyzed information, a parameter of the game medium ID 001 is set to "+50", and then random selection is executed.

The parameter is a value allocated to each random selection target, and influences a probability of random selection of the random selection target. A probability of random selection of a random selection target A is represented by "a parameter of the random selection target A/a sum of parameters of all random selection targets".

For example, a keyword such as "Tokyo Tower" is included in analyzed information, a random selection table for a game medium is changed to a "random selection table 002" different from a normal random selection table 001, and then a game medium is randomly selected. The "random selection table 002" is preferably a random selection table from which only a game medium corresponding to an event in a game is randomly selected, or a random selection table from which only a game medium with a specific attribute is randomly selected.

In a case where a plurality of types of keywords are included in analyzed information, a probability of random selection may be changed by applying change contents of all the keywords. With this configuration, a player can considerably increase a probability of random selection of a game medium desired by the player according to a content that is input by the player, and thus it is possible to improve the satisfaction of the player.

On the other hand, in a case where a plurality of types of keywords are included in analyzed information, a probability of random selection may be changed on the basis of a change content of any one keyword. In this case, for example, a change content may be determined on the basis of priority orders among keyword IDs, the greatest change content may be applied, and a change content of a randomly selected keyword may be applied. With this configuration, it is possible to reduce a probability that a comment or the like that is input by a player becomes a list of words that does not make sense as sentences only for the purpose of increasing a probability of random selection of a game medium desired by the player.

In a case where a plurality of identical types of keywords are included in analyzed information, it is preferable that a change content is applied in a non-overlapping manner. For example, in a case where three keywords such as "fire" are included in analyzed information, a parameter of a fire attribute game medium is preferably set to "+20×1" instead of "+20×3". With this configuration, it is possible to reduce a probability that a comment or the like that is input by a player becomes a list of words that does not make sense as sentences. In a case where a plurality of keywords associated with an identical type of keyword ID are included in analyzed information, change contents may be configured to overlap each other, and may be configured not to overlap each other.

FIG. 22 are examples of master tables regarding a probability of random selection of a game medium, corresponding to at least one of the embodiments of the present invention. FIG. 22A illustrates a master table representing a probability of random selection of each group, for example, in a case where game media are divided into a plurality of groups and are randomly selected.

A master table 431 stores a default parameter 433 and a default random selection probability 434 to be associated with a group name 432. The master table 431 is only an example, and may include other information. The master table 431 is preferably stored in the storage 13 of the computer apparatus.

The group name 432 is a group name when game media are grouped on the basis of a predetermined classification criterion. In the example illustrated in FIG. 20(a), the game media are grouped on the basis of attributes related to the chemistry between game media, but a classification criterion is not limited to this example, and may be a classification criterion depending on, for example, the degree of rarity of a game medium.

The default parameter 433 is a value used for computation of a probability of random selection. The default random selection probability 434 indicates a probability of random selection before a probability of random selection is changed, and is a value calculated by "a default parameter/a sum of default parameters".

For example, in a case where a keyword such as "fire" is included in analyzed information, the master table 421 is referred to, and a change content is specified as "a fire attribute parameter +20 and a water attribute parameter −20". When the specified change content is reflected in the default parameter, the default parameter of the fire attribute group is changed to "220 (=200+20)", and the default parameter of the water attribute group is changed to "180 (=200-20)". As a result, a probability of random selection of the fire attribute group becomes "220/1000", and a probability of random selection of the water attribute group becomes "180/1000". In other words, a probability of random selection of the fire attribute group is increased, and a probability of random selection of the water attribute group is decreased.

For example, a keyword such as "intense heat" is included in analyzed information, the master table 421 is referred to, the default parameter of the fire attribute group is changed to "250 (=200+50)", and thus a sum of the default parameter becomes "1050 (=1000+50)". As a result, a probability of random selection of the fire attribute group becomes "250/1050".

After a group is randomly selected on the basis of the probability of random selection changed as described above, a game medium is randomly selected from among game media included in the selected group. For example, assuming that the fire attribute group is selected when a group is randomly selected, a random selection target in random selection of a game medium is a fire attribute game medium.

FIG. 22B illustrates a master table representing a probability of random selection of a game medium. A master table 441 stores a default parameter 443 and a default random selection probability 444 to be associated with a game medium ID 442. The master table 441 is only an example, and may include other information. The master table 441 is preferably stored in the storage 13 of the computer apparatus.

The game medium ID 442 is an identification symbol for uniquely identifying a game medium. The default parameter 443 is a value used for computation of a probability of random selection. The default random selection probability 444 indicates a probability of random selection before a probability of random selection of each game medium is changed, and is a value calculated by "a default parameter/a sum of default parameters".

In a case where a keyword such as changing of a parameter of a game medium that is a random selection target is included in the information analyzed in step S78, the master table 421 is referred to such that the parameter is changed, and then a game medium is randomly selected. For example, in a case where a keyword such as a "dragon" is included in the analyzed information, the master table 421 is referred to, a default parameter of a game medium having the game medium ID "001" is changed to "150 (=100+50)", and thus a sum of the default parameter becomes "1050 (=1000+50)". As a result, a probability of random selection of the game medium having the game medium ID "001" becomes "150/1050".

In both of random selection of a game medium group and random selection of a game medium included in a randomly selected group, as a specific example of changing a probability of random selection, a description will be made of a case where the comment shown in the comment input field 412 in FIG. 20 is analyzed in step S78. In the example illustrated in FIG. 20, the comment includes "Tuesday" that is a keyword changing a probability of random selection of each group and a "dragon" that is a keyword changing a probability of random selection of a specific game medium. Therefore, in the example illustrated in FIG. 20, keywords having "001" and "101" as the keyword IDs 422 are included.

First, the change content 424 corresponding to the keyword ID "001" is specified, the default parameter of the fire attribute group is increased, the default parameter of the water attribute group is decreased, and then a group is randomly selected.

Next, in a case where a game medium having "001" as the game medium ID 442 is included in the group 432 selected through random selection, the default parameter of the game medium ID "001" is increased, and a game medium is randomly selected. In a case where a game medium having the game medium ID "001" is not included in the group 432 selected through random selection, a default parameter of a game medium included in the selected group 432 may not be changed. In addition, the game medium having the game medium ID "001" may be added to the selected group 432 with a default parameter as zero such that the change content 424 is reflected, and then random selection may be performed.

The flowchart of FIG. 18 will be referred to again. The computer apparatus 1 creates a return comment in response to the predetermined information transmitted in step S75 on the basis of an analysis result of the predetermined information in step S78 (step S80). The comment created in step S80 preferably includes, for example, a keyword extracted from the predetermined information. The comment created in step S80 preferably includes such a content suggesting to what extent a probability of random selection is changed by the extracted keyword. With this configuration, a player can recognize what kind of phrase is set as a keyword causing a probability of random selection to be changed.

The return comment created in step S80 preferably includes link information causing information regarding the predetermined position set in step S77 or information regarding the game medium randomly selected in step S79 to be acquirable.

Next, the computer apparatus 1 transmits information regarding the return comment created in step S80 to the player terminal B and the player terminal A (step S81). In step S81, for example, the return comment may be configured to be transmitted to only the player B and a player having a predetermined relationship with the player B on a game. With this configuration, it is possible to strengthen the ties between players in a game.

Hereinafter, first, a description will be made of a process in the player terminal B after step S81, that is, the player terminal on which the gate is displayed. The player terminal B receives the information transmitted in step S81 (step S82). Next, the player terminal B changes the image of the gate displayed in step S72 to an image corresponding to a game medium on the basis of the information regarding the game medium randomly selected in step S79, included in the information received in step S82 (step S83).

In a case where the image of the gate is not displayed such as a case where the player terminal B terminates a game after step S75 and thus does not start the game, a display screen of the player terminal B is preferably made to transition to a game screen on which the image of the gate was displayed through execution of access to link information included in a return comment that is viewable via a pop notification or another application program. For example, an image corresponding to the game medium randomly selected in step S79 is displayed on the game screen after transition instead of the image of the gate. With this configuration, it is possible to improve a player's convenience.

Next, in a case where an operation of selecting the image of the game medium displayed in step S83 is performed in the player terminal B, a game is advanced by executing a mini game or a virtual battle for acquiring the game medium (step S84), and terminates the process.

In step S84, the game is preferably advanced on the basis of a position of the player terminal B in the real world. In other words, in a case where the position of the player terminal B in the real world is different from the predetermined position set in step S77, the position of the player terminal B may be virtualized as the predetermined position, and the game may be advanced.

Next, a description will be made of a process in the player terminal A after step S81, that is, the player terminal on which the return comment for another player is displayed. The process in the player terminal B in steps S82 to S84 and the process in the player terminal A in steps S85 and S86 are executed separately from each other.

The player terminal A receives the information transmitted in step S81 (step S85). In step S85, the information is received by using, for example, a comment reception function in a game, a pop notification, or another application program. Next, the player terminal B virtualizes the predetermined position set in step S77 as a real position of the player terminal A on the basis of the information received in step S85, and advances the game (step S86). The process in step S86 will be described in detail with reference to a flowchart of FIG. 23.

Figure 23:
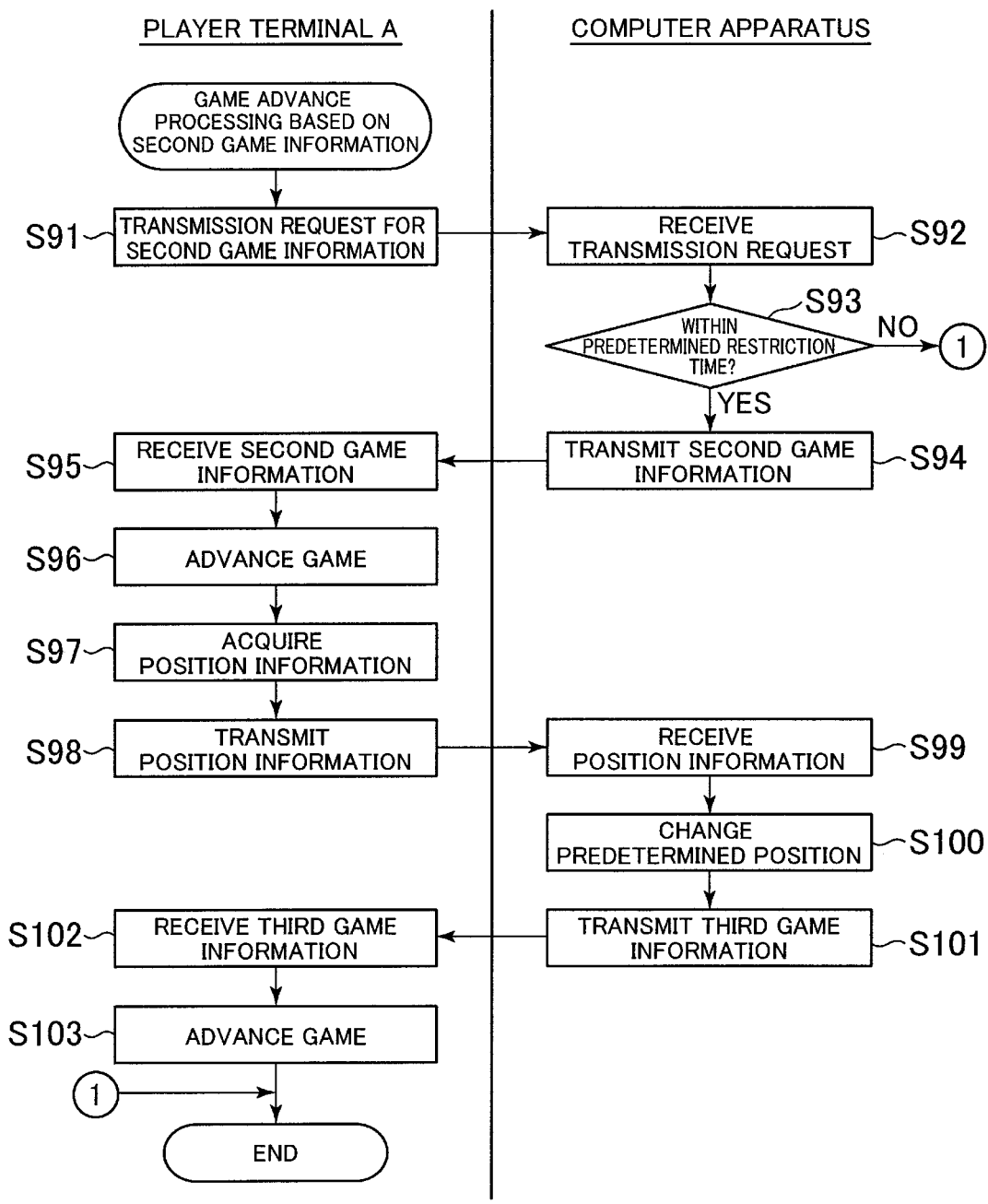
FIG. 23 is a flowchart illustrating a game execution process corresponding to at least one of the embodiments of the present invention.

FIG. 23 is a flowchart illustrating a game execution process corresponding to at least one of the embodiments of the present invention. FIG. 22 is a flowchart illustrating a game execution process based on the second game information, and illustrates the process in step S86 in detail.

First, the player terminal A makes a transmission request for the second game information (step S91). In step S91, for example, the transmission request for the second game information is made on the basis of access of the player terminal A to the link information included in the return comment received in step S85.

Next, the computer apparatus 1 receives the transmission request for the second game information (step S92). Next, the computer apparatus 1 determines whether or not the time at which the transmission request is made is within a predetermined restriction time (step S93). In a case where the transmission request is made exceeding the predetermined restriction time (No in step S93), for example, information indicating that game advancing based on the second game information is disabled is displayed on the player terminal A, and the process is terminated.

The predetermined restriction time is not particularly limited, and may be set as appropriate according to a genre or a content of a game. The predetermined restriction time may be a predetermined time or less (for example, 30 minutes or less) from, for example, the time at which the return comment is transmitted in step S81. The predetermined restriction time may be, for example, a predetermined time period (for example, 9 o'clock to 12 o'clock). The predetermined restriction time is set, and thus game advancing based on the second game information is restricted as appropriate such that game balance is easily maintained. Even in a case where a game is being advanced on the basis of the second game information, the game advancing based on the second game information is preferably terminated at the time of exceeding the predetermined restriction time.

In a case where the transmission request is made within the predetermined restriction time (Yes in step S93), the computer apparatus 1 acquires information regarding a game medium group corresponding to a region including the predetermined position set in step S77 and information regarding a map corresponding to at least a part of the region, from the storage 13 of the computer apparatus 1, and transmits the acquired information (second game information) to the player terminal A (step S94).

Next, the player terminal A receives the second game information transmitted in step S94. Next, the player terminal A advances the game on the basis of information corresponding to a predetermined position different from a real position of the player terminal A according to the received second game information (step S96). In step S96, there is a preferable configuration in which the game medium randomly selected in step S79 is caused to appear, and the game medium is acquirable.

In step S96, for example, a map including the predetermined position is displayed on the player terminal A as a result of the predetermined position set in step S77 being virtualized as a real position of the player terminal A. The game medium appearing in the player terminal A is a game medium corresponding to the predetermined position. With this configuration, a player can advance a game on the basis of a position different from the current position of a player terminal even though the player does not perform movement in the real world, and thus it is possible to improve the satisfaction of the player who cannot perform sufficient movement in the real world.

Next, the player terminal A acquires position information regarding the position of the player terminal A in the real world (step S97). Next, the player terminal A transmits the position information acquired in step S97 to the computer apparatus 1 (step S98). Next, the computer apparatus 1 receives the position information transmitted in step S98 (step S99).

Next, the computer apparatus 1 changes the predetermined position set in step S77 on the basis of the position information received in step S99 (step S100). In step S100, a process is performed in which a correction value for converting position information regarding a real position of the player terminal when game advancing based on the second game information is started into position information regarding the predetermined position set in step S77 is stored in advance, and the position information regarding the real position of the player terminal A acquired in step S99 is converted by using the correction value. The process in step S100 is separately performed in each player terminal. In other words, the predetermined position changed on the basis of the position information of the player terminal A is not applied to player terminals other than the player terminal A.

Next, the computer apparatus 1 acquires information regarding a game medium group corresponding to a region including the predetermined position changed in step S100 and information regarding a map corresponding to at least a part of the region from the storage 13 of the computer apparatus 1, and transmits the acquired information (third game information) to the player terminal A (step S101).

Next, the player terminal A receives the third game information transmitted in step S101 (step S102). Next, the player terminal A advances a game on the basis of the third game information received in step S102 (step S103), and terminates the process.

A predetermined terminating condition may be set in game advancing based on the second game information or the third game information. The predetermined terminating condition is not particularly limited, and may be, for example, a case where a predetermined restriction time has elapsed, a player terminal is moved by a predetermined distance, or an acquired game medium reaches a predetermined upper limit. The predetermined terminating condition may be, for example, a case where a dedicated parameter consumed by a player is set when game advancing based on the second game information or the third game information is performed, and the parameter is equal to or less than a predetermined value (for example, zero).

Through the processes in steps S97 to S103, a virtual position of the player terminal A is changed according to movement of a position of the player terminal A in the real world. In other words, in step 96, in a case where the map corresponding to the predetermined position set in step S77 is displayed on the player terminal A, and then a real position of the player terminal A is moved, a position of the player terminal A is also moved, for example, on the map according to the movement. As a result, the displayed map is changed, and thus an appearing game medium is also changed. With this configuration, it is possible to give a player a sense of searching a location different from a real position and thus to improve the amusement of a game.

As one aspect of the tenth embodiment, in a game using a position of a player terminal in the real world by enabling the game to be advanced on the basis of the second game information corresponding to a predetermined position in the real world that is different from a position indicated by position information of the player terminal, it is possible to improve the satisfaction of a player who cannot perform sufficient movement in the real world.

As one aspect of the tenth embodiment, not only a game medium corresponding to a position indicated by position information of a player terminal but also a game medium corresponding to a position different from the position indicated by the position information of the player terminal can be acquired, and thus it is possible to realize both of improvement of amusement due to the use of the position information of the player terminal and improvement of the satisfaction of player who cannot perform sufficient movement in the real world.

As one aspect of the tenth embodiment, a game is advanced by virtualizing a position different from a position indicated by position information of a player terminal as a position of the player terminal, and the virtual position of the player terminal is changed according to movement of a position of the player terminal in the real world. Therefore, it is possible to give a player a sense of warping to the virtual position. Movement in the real world and movement of a virtual position interlock with each other, and thus it is possible to virtually search even a remote location which is difficult to actually visit and therefore to improve the amusement of a game.

As one aspect of the tenth embodiment, since a predetermined position that is a virtual movement destination of a player is set in a case where a predetermined second condition is satisfied, it is possible to prevent the original game purpose of using position information from being excessively faded due to limitless increase of virtual movement destinations of the player.

As one aspect of the tenth embodiment, since a predetermined position that is a virtual movement destination of a player is set on the basis of another-player information, for example, it is possible to increase the chance to perform communication between players and thus to improve the amusement of a game. On the other hand, since the predetermined position is set on the basis of an event content in a game, for example, it is possible to provide such an event of virtually searching a specific street to a player and thus to improve the amusement of the game.

As one aspect of the tenth embodiment, since the predetermined second condition is that predetermined information input by another player is received by the computer apparatus, and the predetermined first condition is that a player terminal accesses the predetermined information or information related to the predetermined information, it is possible to activate communication between players in a game.

As one aspect of the tenth embodiment, since input of predetermined information for satisfying the predetermined second condition is executed by using another application program interlocking with a game program, even people not using a game related to the present embodiment can view the input predetermined information via another application program and thus many people can be interested in the game. For example, link information to a game is included in predetermined information that is displayed via another application, and thus it is possible to guide people to the game.

As one aspect of the tenth embodiment, since the computer apparatus creates a return comment in response to a comment received from another player, the satisfaction of another player having transmitted the comment can be increased, and it can be expected that a player brought into a situation of being able to transmit a comment positively transmits the comment.

As one aspect of the tenth embodiment, since, in a case where the computer apparatus receives predetermined information input by another player, a game medium is randomly selected, and the game medium selected through random selection is acquirable by another player, the satisfaction of another player having transmitted the predetermined information can be increased, and it can be expected that a player brought into a situation of being able to transmit predetermined information positively transmits the predetermined information.

As one aspect of the tenth embodiment, a probability of random selection of a game medium acquirable by another player is changed according to at least part of predetermined information input by another player, and thus more amusement can be provided to input of predetermined information.

As one aspect of the tenth embodiment, a probability of random selection of a game medium acquirable by another player is changed according to at least partial character string included in a comment input by another player, and thus more amusement can be provided to input of a comment. An element of guessing what kind of character string is used to change a probability of random selection of a corresponding game medium occurs on the basis of a comment content and a random selection result, and thus it is possible to further improve the amusement of a game. In a case where the above-described guessing is advanced, such a comment causing a probability of random selection of a game medium desired by a player to be increased, and thus it is possible to increase the satisfaction for a game.

As one aspect of the tenth embodiment, since a game medium randomly selected on the basis of another player inputting predetermined information is acquirable by a player who does not input predetermined information, it is possible to increase the chance to acquire a game medium and thus to improve the satisfaction of the player.

As one aspect of the tenth embodiment, inputting of predetermined information that is a condition for setting a predetermined position that is a virtual movement destination of a player is executable on the basis of a predetermined probability, it is possible to prevent the original game purpose of using position information from being excessively faded due to limitless increase of virtual movement destinations of the player.

As one aspect of the tenth embodiment, for example, in a case where player information and another player information are associated with each other, for example, when a player and another player are in a friend relationship, a predetermined position that is a virtual movement destination of the player is set on the basis of the another-player information, and thus the connection between the players becomes an important element in the game strategy, so that communication between the players can be activated.

As one aspect of the tenth embodiment, a restriction is provided in a time for which a game can be advanced on the basis of the second game information, and thus game advancing based on the second game information can be appropriately restricted such that game balance is easily maintained.

In the tenth embodiment, the "player terminal", the "player", the "computer apparatus", the "game", the "position information", the "position", the "first game information", the "second game information", the "game information", the "region", the "different position", the "game medium", the "information regarding a game medium", the "predetermined first condition", and the phrase "advancing a game", the contents described in the first embodiment can be adopted respectively within a necessary scope.

In the tenth embodiment, the term "acquisition" and the phrase "a game medium and a player being associated with each other", the contents described in the second embodiment can be adopted respectively within a necessary scope. In the tenth embodiment, the "map in the real world", the phrase "advancing a game by virtualizing", and the phrase "changing according to movement", the contents described in the third embodiment can be adopted respectively within a necessary scope. In the tenth embodiment, the "predetermined second condition", the "another-player information", and the "event", the contents described in the fourth embodiment can be adopted respectively within a necessary scope.

In the tenth embodiment, the "interlocking another application program" and the term "access", the contents described in the fifth embodiment can be adopted respectively within a necessary scope. In the tenth embodiment, the "at least part of received information" and the phrase "changing a probability of random selection", the contents described in the seventh embodiment can be adopted respectively within a necessary scope.

In the tenth embodiment, the "attribute" indicates, for example, common property provided in game media or a classification criterion for a game medium. The common property provided in game media may be, for example, property determining the chemistry between game media, such as superiority or interiority to a game medium that is an enemy in a virtual battle. The classification criterion for a game medium may be, for example, a rank of a game medium determined on the basis of a level of a parameter used in a game or a level of an effect when a game medium is used, or the degree of rarity of a game medium. The "degree of rarity" indicates an index representing rarity of a game medium, and, for example, as the degree of rarity of a game medium becomes higher, the chance for a player to acquire the game medium is reduced.

The "gate" indicates, for example, a symbol appearing in a case where a player can satisfy the predetermined second condition. The "gate" preferably appears according to a result of random selection executed on the basis of a predetermined probability of random selection at a predetermined random selection timing. The "gate" may be displayed in a case where a player has cleared a predetermined game task in a game.

The "keyword" indicates, for example, a preset phrase for changing a probability of random selection of a game medium. The "keyword" is preferably set such that a meaning indicated by the keyword is associated with a change content of a probability of random selection in the keyword. Here, the phrase "associated with a change content" indicates, for example, that the change content is supposed from the "keyword".

The "third game information" indicates, for example, information regarding a game medium corresponding to a changed predetermined position or a region including the changed predetermined position in a case where the predetermined position is changed by the change unit 223. In other words, the "third game information" is information corresponding to a virtual position, changed according to movement of a position of a player terminal in the real world after a player virtually moves to a predetermined position. For example, in a case where the player virtually moves to the predetermined position, and then a position of the player terminal is not greatly moved in the real world, the "third game information" may be the same as the "second game information".

APPENDIX

The description of the embodiments described above has been described so that those having ordinary knowledge in the field to which the invention belongs can carry out the following invention.

[1] A game program executed in a computer apparatus that is connectable to a plurality of player terminals each of which is operated by a player through communication, the game program causing the computer apparatus to function as:
- a receiver that receives position information regarding a position of the player terminal in the real world;
- a first game information transmitter that transmits first game information corresponding to the position indicated by the position information received by the receiver to the player terminal; and
- a second game information transmitter that transmits, to the player terminal, second game information corresponding to a predetermined position in the real world that is different from the position indicated by the position information received by the receiver in a case where a predetermined first condition is satisfied,
- wherein the player terminal transmits the position information regarding the position of the player terminal in the real world to the computer apparatus, receives the first game information transmitted by the first game information transmitter and/or the second game information transmitted by the second game information transmitter, and advances a game on the basis of the received first game information and/or second game information.

[2] The game program according to the above [1], wherein the first game information and the second game information include information regarding a game medium that is acquirable by the player.

[3] The game program according to the above [1] or [2], wherein, in a case where the second game information includes position information regarding the predetermined position, and the player terminal advances the game on the basis of the second game information, the player terminal displays a map of the real world corresponding to the position information regarding the predetermined position, and advances the game by virtualizing the predetermined position as the position of the player terminal in the real world, and
wherein the game program further causes the computer apparatus to function as a changer that changes the predetermined position according to movement of the position of the player terminal in the real world.

[4] The game program according to any one of the above [1] to [3], further causing the computer apparatus to function as a setter that sets the predetermined position on the basis of another-player information regarding another player or an event content in the game in a case where a predetermined second condition is satisfied.

[5] The game program according to the above [4],
wherein the predetermined second condition is that another player terminal receives input of information according to a predetermined function for receiving information input executed by a game program for a player terminal corresponding to the game program or another application program interlocking with the game program for the player terminal, and the received information is received in the computer apparatus,
wherein the setter sets the predetermined position on the basis of a position of the another player terminal in the real world in a case where the computer apparatus receives the information, and
wherein the predetermined first condition is that the player terminal accesses the information received according to the predetermined function for receiving information input or information associated with the information.

[6] The game program according to the above [5],
wherein the predetermined function for receiving information input is capable of receiving input of a comment,
wherein the game program further causes the computer apparatus to function as a creator that creates a return comment in response to the comment received in the another player terminal, and
wherein the predetermined first condition is that the player terminal accesses the return comment created by the creator.

[7] The game program according to the above [5] or [6], further causing the computer apparatus to function as:
a random selector that randomly selects a game medium in a case where the information received according to the predetermined function for receiving information input is received; and
a random selection result transmitter that transmits information regarding the game medium randomly selected by the random selector to the another player terminal,
wherein the another player terminal receives the information regarding the game medium transmitted by the random selection result transmitter, and enables another player operating the another player terminal to acquire the game medium corresponding to the received information.

[8] The game program according to the above [7],
wherein the random selector changes a probability of random selection on the basis of at least part of the information received according to the predetermined function for receiving information input, and randomly selects the game medium.

[9] The game program according to the above [7] or [8],
wherein the predetermined function for receiving information input is capable of receiving input of a comment, and
wherein the random selector changes a probability of random selection on the basis of at least a part of a character string included in the comment received according to the predetermined function for receiving information input, and randomly selects the game medium.

[10] The game program according to any one of the above [7] to [9],
wherein, in a case where the predetermined first condition is satisfied in the player terminal, the random selection result transmitter transmits the information regarding the game medium randomly selected by the random selector to the player terminal, and the player terminal receives the information regarding the game medium transmitted by the random selection result transmitter, and enables the player to acquire the game medium corresponding to the received information.

[11] The game program according to any one of the above [5] to [10],
wherein the predetermined function for receiving information input is executable on the basis of a predetermined probability.

[12] The game program according to the above [4], further causing the computer apparatus to function as:
an associator that associates player information regarding the player operating the player terminal with the another-player information regarding the another player operating another player terminal,
wherein the predetermined second condition is that the player information is associated with the another-player information by the associator, and
wherein the setter sets the predetermined position on the basis of the another-player information.

[13] The game program according to the above [4],
wherein the predetermined second condition is that a predetermined event is held in the game,
wherein the predetermined first condition is that the player participates in the predetermined event, or the player achieves an event condition imposed on the predetermined event, and
wherein the setter sets the predetermined position according to a content of the predetermined event.

[14] The game program according to any one of the above [1] to [13], further causing the computer apparatus to function as a restrictor that provides a restriction in a time for which the player terminal can advance the game on the basis of the second game information.

[15] A computer apparatus installed with the game program according to any one of the above [1] to [14].

[16] A game system implemented by a player terminal operated by each player and a computer apparatus that is connectable to the player terminal through communication, the game system comprising:
a position information transmitter that transmits position information regarding a position of the player terminal in the real world to the computer apparatus;
a position information receiver that receives the position information transmitted by the transmitter in the computer apparatus;
a first game information transmitter that transmits first game information corresponding to the position indicated by the position information received by the position information receiver to the player terminal;
a second game information transmitter that transmits, to the player terminal, second game information corresponding to a predetermined position in the real world that is different from the position indicated by the position information received by the position information receiver in a case where a predetermined first condition is satisfied;
a game information receiver that receives the first game information transmitted by the first game information transmitter and/or the second game information transmitted by the second game information transmitter in the player terminal; and an advancer that advances a game on the basis of the first game information and/or the second game information received by the game information receiver.

[17] A game program executed in a player terminal in a game system implemented by the player terminal operated by each player and a computer apparatus that is connectable to the player terminal through communication, the game system receiving position information regarding a position of the player terminal in the real world from the player terminal, transmitting first game information corresponding to the position indicated by the received position information to the player terminal, and transmitting, to the player terminal, second game information corresponding to a predetermined position in the real world that is different from the position indicated by the position information received from the player terminal in a case where a predetermined first condition is satisfied, the game program causing the player terminal to function as:

a position information transmitter that transmits the position information regarding the position of the player terminal in the real world to the computer apparatus;

a game information receiver that receives the first game information and/or the second game information transmitted from the computer apparatus; and an advancer that advances a game on the basis of the first game information and/or the second game information received by the game information receiver.

[18] A player terminal installed with the game program according to the above [17].

[19] A method for controlling a game program executed in a computer apparatus that is connectable to a plurality of player terminals each of which is operated by a player through communication, the method causing the computer apparatus to execute:

a reception step of receiving position information regarding a position of the player terminal in the real world;

a first game information transmission step of transmitting first game information corresponding to the position indicated by the position information received in the reception step to the player terminal; and a second game information transmission step of transmitting, to the player terminal, second game information corresponding to a predetermined position in the real world that is different from the position indicated by the position information received in the reception step in a case where a predetermined first condition is satisfied, wherein the player terminal transmits the position information regarding the position of the player terminal in the real world to the computer apparatus, receives the first game information transmitted in the first game information transmission step and/or the second game information transmitted in the second game information transmission step, and advances a game on the basis of the received first game information and/or second game information.

[20] A game control method executed in a game system including a player terminal operated by each player and a computer apparatus that is connectable to the player terminal through communication, the game control method causing the game system to execute:

a position information transmission step of transmitting position information regarding a position of the player terminal in the real world to the computer apparatus;

a position information reception step of receiving the position information transmitted in the position information transmission step in the computer apparatus;

a first game information transmission step of transmitting first game information corresponding to the position indicated by the position information received in the position information reception step to the player terminal;

a second game information transmission step of transmitting, to the player terminal, second game information corresponding to a predetermined position in the real world that is different from the position indicated by the position information received in the position information reception step in a case where a predetermined first condition is satisfied;

a game information reception step of receiving the first game information transmitted in the first game information transmission step and/or the second game information transmitted in the second game information transmission step in the player terminal; and an advancing step of advancing a game on the basis of the first game information and/or the second game information received in the game information reception step.

REFERENCE SIGNS LIST

1 COMPUTER APPARATUS
11 CONTROLLER
12 RAM
13 STORAGE
14 COMMUNICATION INTERFACE
2 GAME SYSTEM
3 PLAYER TERMINAL
31 CONTROLLER
32 RAM
33 STORAGE
34 SOUND PROCESSOR
35 SOUND OUTPUT DEVICE
36 SENSOR UNIT
37 FRAME MEMORY
38 GRAPHICS PROCESSOR
39 DISPLAY UNIT
40 DISPLAY SCREEN
41 TOUCH INPUT UNIT
42 COMMUNICATION INTERFACE
43 INTERFACE UNIT
44 INPUT UNIT
4 COMMUNICATION NETWORK

The invention claimed is:

1. A non-transitory computer-readable recording medium comprising a game program, the game program configured to be executed by a computer apparatus that is connectable to a plurality of player terminals each of which is operated by a player through communication, the game program causing the computer apparatus to:

receive position information regarding a position of a player terminal, from among the plurality of player terminals, in the real world;

transmit first game information corresponding to the position indicated by the position information to the player terminal; and transmit, to the player terminal, second game information corresponding to a predetermined position in the real world that is different from the position indicated by the position information in a case where a predetermined first condition is satisfied, wherein the player terminal transmits the position information regarding the position of the player terminal in the real world to the computer apparatus, receives the first game information and the second game information, displays a map corresponding to the predetermined position, and advances a game by virtualizing the predetermined position as the position of the player terminal in the real world and executing a match between a first game medium selected by the player from among owned game medium and a second game medium based on the second game information.

2. The non-transitory computer-readable recording medium according to claim 1,
wherein the first game information and the second game information regard a third game medium that is acquirable by the player.

3. The non-transitory computer-readable recording medium according to claim 1,
wherein the game program further causes the computer apparatus to change the predetermined position according to movement of the position of the player terminal in the real world.

4. The non-transitory computer-readable recording medium according to claim 1, the game program further causing the computer apparatus to:
set the predetermined position on a basis of another-player information regarding another player or an event content in the game in a case where a predetermined second condition is satisfied.

5. The non-transitory computer-readable recording medium according to claim 4,
wherein the predetermined second condition is that another player terminal receives input of information according to a predetermined function for receiving information input executed by a second game program for a second player terminal corresponding to the second game program or another application program interlocking with the game program for the player terminal, and the information is received in the computer apparatus,
wherein the predetermined position is set on a basis of a position of the another player terminal in the real world in a case where the computer apparatus receives the information, and
wherein the predetermined first condition is that the player terminal accesses the information received according to the predetermined function for receiving information input or information associated with the information.

6. The non-transitory computer-readable recording medium according to claim 5, the game program further causing the computer apparatus to:
randomly select a fourth game medium in a case where the information received according to the predetermined function for receiving information input is received; and
transmit information regarding the fourth game medium randomly selected to the another player terminal,
wherein the another player terminal receives the information regarding the fourth game medium randomly selected, and enables another player operating the another player terminal to acquire the fourth game medium randomly selected.

7. The non-transitory computer-readable recording medium according to claim 6,
wherein a probability of random selection, for randomly selecting the fourth game medium, is changed on a basis of at least part of the information received according to the predetermined function for receiving information input.

8. The non-transitory computer-readable recording medium according to the claim 6,
wherein the predetermined function for receiving information input is capable of receiving input of a comment, and
wherein a probability of random selection, for randomly selecting the fourth game medium, is changed on a basis of at least a part of a character string included in the comment received according to the predetermined function for receiving information input.

9. The non-transitory computer-readable recording medium according to the claim 6,
wherein, in a case where the predetermined first condition is satisfied in the player terminal, the information regarding the fourth game medium randomly selected is transmitted to the player terminal, and the player terminal receives the information regarding the fourth game medium randomly selected, and enables the player to acquire the fourth game medium randomly selected.

10. The non-transitory computer-readable recording medium according to the claim 5,
wherein the predetermined function for receiving information input is capable of receiving input of a comment,
wherein the game program further causes the computer apparatus to create a return comment in response to the comment received in the another player terminal, and
wherein the predetermined first condition is that the player terminal accesses the return comment.

11. The non-transitory computer-readable recording medium according to the claim 5,
wherein the predetermined function for receiving information input is executable on a basis of a predetermined probability.

12. The non-transitory computer-readable recording medium according to the claim 4, the game program further causing the computer apparatus to:
associate player information regarding the player operating the player terminal with the another-player information regarding the another player operating another player terminal,
wherein the predetermined second condition is that the player information is associated with the another-player information, and
wherein the predetermined position is set on the basis of the another-player information.

13. The non-transitory computer-readable recording medium according to the claim 4,
wherein the predetermined second condition is that a predetermined event is held in the game,
wherein the predetermined first condition is that the player participates in the predetermined event, or the player achieves an event condition imposed on the predetermined event, and
wherein the predetermined position is set according to a content of the predetermined event.

14. The non-transitory computer-readable recording medium according to the claim 1, the game program further causing the computer apparatus to:
provide a restriction in a time for which the player terminal can advance the game on a basis of the second game information.

15. A non-transitory computer-readable medium including a game program, the game program configured to be executed by a player terminal in a game system implemented by a plurality of player terminals each of which is operated by a player and a computer apparatus that is connectable to the player terminal through communication, the game system receiving position information regarding a position of the player terminal in the real world from the player terminal, transmitting first game information corresponding to the position indicated by the position information to the player terminal, and transmitting, to the player terminal, second game information corresponding to a predetermined position in the real world that is different from the position indicated by the position information received from the player terminal in a case where a predetermined first condition is satisfied, the game program causing the player terminal to:

transmit the position information regarding the position of the player terminal in the real world to the computer apparatus;

receive the first game information and the second game information transmitted from the computer apparatus;

display a map corresponding to the predetermined position; and advance a game by virtualizing the predetermined position as the position of the player terminal in the real world and executing a match between a first game medium selected by the player from among owned game medium and a second game medium based on the second game information.

16. A method for controlling a game, the game being executed by a computer apparatus that is connectable to a plurality of player terminals each of which is operated by a player through communication, the method comprising:

receiving position information regarding a position of a player terminal, from among the plurality of player terminals, in the real world;

transmitting first game information corresponding to the position indicated by the position information to the player terminal; and transmitting, to the player terminal, second game information corresponding to a predetermined position in the real world that is different from the position indicated by the position information in a case where a predetermined first condition is satisfied, wherein the player terminal transmits the position information regarding the position of the player terminal in the real world to the computer apparatus, receives the first game information and the second game information, displays a map corresponding to the predetermined position, and advances a game by virtualizing the predetermined position as the position of the player terminal in the real world and executing a match between a first game medium selected by the player from among owned game medium and a second game medium based on the second game information.

* * * * *